(12) United States Patent
Murkute et al.

(10) Patent No.: US 12,155,092 B1
(45) Date of Patent: Nov. 26, 2024

(54) POTTING DAM

(71) Applicant: Rivian IP Holdings, LLC, Irvine, CA (US)

(72) Inventors: Akshay Kishor Murkute, Irvine, CA (US); Andrew Richard Campbell, Laguna Niguel, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/540,697

(22) Filed: Dec. 14, 2023

Related U.S. Application Data

(60) Provisional application No. 63/511,609, filed on Jun. 30, 2023.

(51) Int. Cl.
| | | |
|---|---|---|
| *H01M 50/588* | (2021.01) | |
| *H01M 50/271* | (2021.01) | |
| *H01M 50/505* | (2021.01) | |

(52) U.S. Cl.
CPC ....... *H01M 50/588* (2021.01); *H01M 50/271* (2021.01); *H01M 50/505* (2021.01)

(58) Field of Classification Search
CPC . H01M 50/588; H01M 50/271; H01M 50/505
See application file for complete search history.

(56) References Cited

U.S. PATENT DOCUMENTS

| | | |
|---|---|---|
| 5,495,889 A | 3/1996 | Dubelloy |
| 5,977,859 A | 11/1999 | Kawamura |
| 8,897,010 B2 | 11/2014 | Shepard |
| 8,991,478 B2 | 3/2015 | Zaffetti |
| 8,999,548 B2 | 4/2015 | Sun et al. |
| 9,545,010 B2 | 1/2017 | Coackley et al. |
| 9,568,257 B2 | 2/2017 | Moruzzi |
| 10,180,289 B2 | 1/2019 | Vanderwees |
| 10,211,443 B2 | 2/2019 | Coackley et al. |
| 10,297,813 B2 | 5/2019 | Takano |
| 10,964,931 B2 | 3/2021 | Coackley et al. |
| 11,133,538 B2 | 9/2021 | Ge et al. |
| 11,134,590 B2 | 9/2021 | Wang |
| 11,201,364 B2 | 12/2021 | Kawakami |
| 11,302,997 B2 | 4/2022 | Wynn et al. |
| 2011/0095859 A1 | 4/2011 | Shibata |
| 2012/0107663 A1 | 5/2012 | Burgers |
| 2013/0071720 A1 | 3/2013 | Zahn |
| 2013/0244077 A1 | 9/2013 | Palanchorn |
| 2015/0364744 A1 | 12/2015 | Takano |

(Continued)

FOREIGN PATENT DOCUMENTS

| | | | | |
|---|---|---|---|---|
| CN | 112421088 | * | 2/2021 | ............ H01M 10/04 |
| FR | 2705085 | * | 11/1994 | ............ B65D 21/08 |

(Continued)

OTHER PUBLICATIONS

Machine English translation of CN 112421088 (Year: 2021).*
Machine English translation of FR 2705085 (Year: 1994).*

*Primary Examiner* — Michael L Dignan
(74) *Attorney, Agent, or Firm* — BAKERHOSTETLER

(57) ABSTRACT

Aspects of the subject disclosure relate to various features of a battery subassembly, such as a battery module. The battery subassembly may be implemented in an electric vehicle or in a building. The battery subassembly may include a potting dam as described herein.

20 Claims, 18 Drawing Sheets

(56) References Cited

U.S. PATENT DOCUMENTS

| | | | |
|---|---|---|---|
| 2016/0025428 A1 | 1/2016 | Hendriz | |
| 2016/0204486 A1 | 7/2016 | Kenney | |
| 2016/0315304 A1 | 10/2016 | Biskup | |
| 2016/0315365 A1 | 10/2016 | Vanderwees | |
| 2017/0244143 A1 | 8/2017 | Burgers | |
| 2017/0256826 A1* | 9/2017 | Hong | H01M 10/425 |
| 2018/0205125 A1 | 7/2018 | Bergers | |
| 2018/0252479 A1 | 9/2018 | Kenney | |
| 2018/0294449 A1 | 10/2018 | Zeng | |
| 2018/0337434 A1 | 11/2018 | Burgers | |
| 2019/0109357 A1 | 4/2019 | Kenney | |
| 2019/0366876 A1 | 12/2019 | Cheadle | |
| 2020/0067056 A1 | 2/2020 | Wynn et al. | |
| 2020/0076022 A1* | 3/2020 | Kawakami | H01M 50/581 |
| 2020/0136205 A1 | 4/2020 | Graves | |
| 2020/0185686 A1* | 6/2020 | Ng | H01M 50/505 |
| 2020/0203941 A1 | 6/2020 | Ing | |
| 2020/0243934 A1 | 7/2020 | Galvis | |
| 2021/0175588 A1 | 6/2021 | Coackley et al. | |
| 2021/0242516 A1 | 8/2021 | Rahim | |
| 2021/0247145 A1 | 8/2021 | Vakilimoghaddam | |
| 2021/0254895 A1 | 8/2021 | Vakilimoghaddam | |
| 2022/0021048 A1 | 1/2022 | Boddakayala | |
| 2022/0120518 A1 | 4/2022 | Vanderwees | |
| 2022/0123442 A1 | 4/2022 | Zu | |
| 2022/0131212 A1 | 4/2022 | Collins | |
| 2022/0190445 A1 | 6/2022 | Wynn et al. | |
| 2022/0311103 A1 | 9/2022 | Findlay et al. | |
| 2022/0336883 A1 | 10/2022 | Galvis | |
| 2023/0111495 A1* | 4/2023 | Jung | H01M 50/505 429/120 |
| 2023/0216147 A1* | 7/2023 | Yoon | H01M 10/613 429/90 |
| 2023/0378561 A1* | 11/2023 | Totman | H01M 50/271 |

FOREIGN PATENT DOCUMENTS

| | | |
|---|---|---|
| WO | WO 2018/174621 | 9/2018 |
| WO | WO 2019/054765 | 9/2019 |

* cited by examiner

POTTING DAM

CROSS REFERENCE TO RELATED APPLICATIONS

This application claims the benefit of priority to U.S. Provisional Patent Application No. 63/511,609, entitled, "BATTERY SUBASSEMBLY", filed on Jun. 30, 2023, the disclosure of which is hereby incorporated herein in its entirety.

INTRODUCTION

Batteries are often used as a source of power, including as a source of power for electric vehicles that include wheels that are driven by an electric motor that receives power from the battery.

Aspects of the subject technology can help to improve the manufacturability and/or reliability of electric vehicles, which can help to mitigate climate change by reducing greenhouse gas emissions.

SUMMARY

The present disclosure generally relates to various aspects of a battery subassembly, such as a battery module. As examples, aspects of the subject disclosure include potting dam features for a battery subassembly.

In accordance with aspects of the subject technology, an apparatus is provided that includes a potting dam that includes a peripheral portion configured to cover a portion of a structure of a battery subassembly; a wall that extends from the peripheral portion; and a central opening defined by the wall, in which the wall is configured to dam a potting material provided via the central opening.

The wall may extend around and define an entire periphery of the central opening, and may at an obtuse angle from the peripheral portion. The peripheral portion of the potting dam may be configured to extend along the portion of the structure in a direction that is parallel to the structure. The peripheral portion of the potting dam may be configured to be spaced apart by a gap from the peripheral portion of the structure, and to allow a portion of the potting material to fill a portion of the gap. The structure may include a current collector assembly. The potting dam may also include a first overhang that extends from the peripheral portion of the potting dam along a first edge of the potting dam, and a second overhang that extends from the peripheral portion of the potting dam along a second edge of the potting dam.

The potting dam may include a first edge, a second edge perpendicular to the first edge, a third edge parallel to and separated by the central opening from the first edge, and a fourth edge parallel to and separated by the central opening from the second edge. The potting dam may also include a first stiffener that extends along a portion of the peripheral portion of the potting dam on the first edge, and a second stiffener that extends along a portion of the peripheral portion of the potting dam on the third edge. The first edge and the third edge may have a first length, the second edge and the fourth edge may have a second length, and the first length may be greater than the second length.

The potting dam may also include a first opening on the first edge and a second opening on the second edge, the first opening and the second opening each configured to receive a fastener for securing the potting dam to the battery subassembly. The peripheral portion of the potting dam may extend a distance of at least twenty millimeters from the wall. The potting dam may also include a corner feature configured to control a collapse of the wall responsive to a pressure on a top edge of the wall.

In accordance with other aspects of the subject technology, a battery subassembly may be provided that includes a potting dam that includes a peripheral configured to cover a portion of a structure of the battery subassembly; a wall that extends from the peripheral; and an opening defined by the wall. The wall may be configured to dam a potting material provided onto the structure via the opening. The battery subassembly may also include the structure. The structure may include a current collector assembly.

The battery subassembly may also include the potting material. The potting material may include a first portion disposed within the opening of the potting dam, and a second portion in contact with a surface of the peripheral. The second portion in contact with the surface of the peripheral may be disposed in a gap between the structure and the peripheral of the potting dam. The potting material may include a third portion disposed in contact with one or more battery cells of the battery subassembly. The second portion of the potting material may extend around an entire periphery of the first portion. The potting material may include a syntactic potting material and the wall may extend at an obtuse angle from the peripheral portion.

In accordance with other aspects of the subject technology, a method may be provided that includes: attaching, to a battery subassembly, a peripheral portion of a potting dam having a wall extending from the peripheral portion, the wall defining a central opening of the potting dam; providing a potting material onto the battery subassembly via the central opening in the potting dam; and preventing, with the wall and the peripheral portion of the potting dam, the potting material from flowing over an edge of the battery subassembly. Preventing, with the wall and the peripheral portion of the potting dam, the potting material from flowing over the edge of the battery subassembly may include allowing a portion of the potting material to flow under the peripheral portion of the potting dam between a surface of the peripheral portion of the potting dam and a surface of an electrical structure of the battery subassembly.

In accordance with other aspects of the subject technology, an apparatus is provided that includes a cover for a battery subassembly, the cover including: a planar main structure configured to cover an electrical structure of the battery subassembly, wherein the planar main structure comprises an outer surface and an opposing inner surface that is configured to face the electrical structure of the battery subassembly; and a sealing feature that protrudes from the inner surface of the planar main structure and is configured to sealingly interface with a peripheral surface of the battery subassembly to impede a liquid from passing between the battery subassembly and the cover.

An edge portion of the planar main structure may extend beyond the sealing feature and may include an attachment feature configured to allow the edge portion to be fixed to a cell carrier. The attachment feature may include an opening configured to receive a fastener therethrough. The edge portion of the cover may also include an overhang configured to curve over an outer edge of the cell carrier. The sealing feature may be attached to the inner surface of the cover. The sealing feature may be an integral feature of the cover. The cover may be formed from a material at least fifty percent of which is a recycled polymer material. The cover may be formed from recycled polyethylene terephthalate (PET). The sealing feature may run around at least a portion of a periphery of the planar main structure of the cover.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Aspects of the subject technology described herein relate to a potting dam for a battery module. The potting dam may include a large central opening into which potting material can be poured or otherwise dispensed. Once cured, the potting material within the central opening may form a top surface of the battery module. The potting dam may include a first portion that overlays a peripheral portion of a current collector assembly (CCA), and a wall that extends at an angle with respect to first portion. When the potting material is poured or dispensed into the central opening of the potting dam (e.g., onto the surface of the CCA), the wall contains the potting material while a portion of the potting material flows under the first portion (between the first portion and the CCA) and adheres to the first portion to block further flow of the potting material. In this way, the potting material may be prevented from flowing over the edge of the CCA and/or a cell tote in which battery cells are disposed.

Figure 1A:
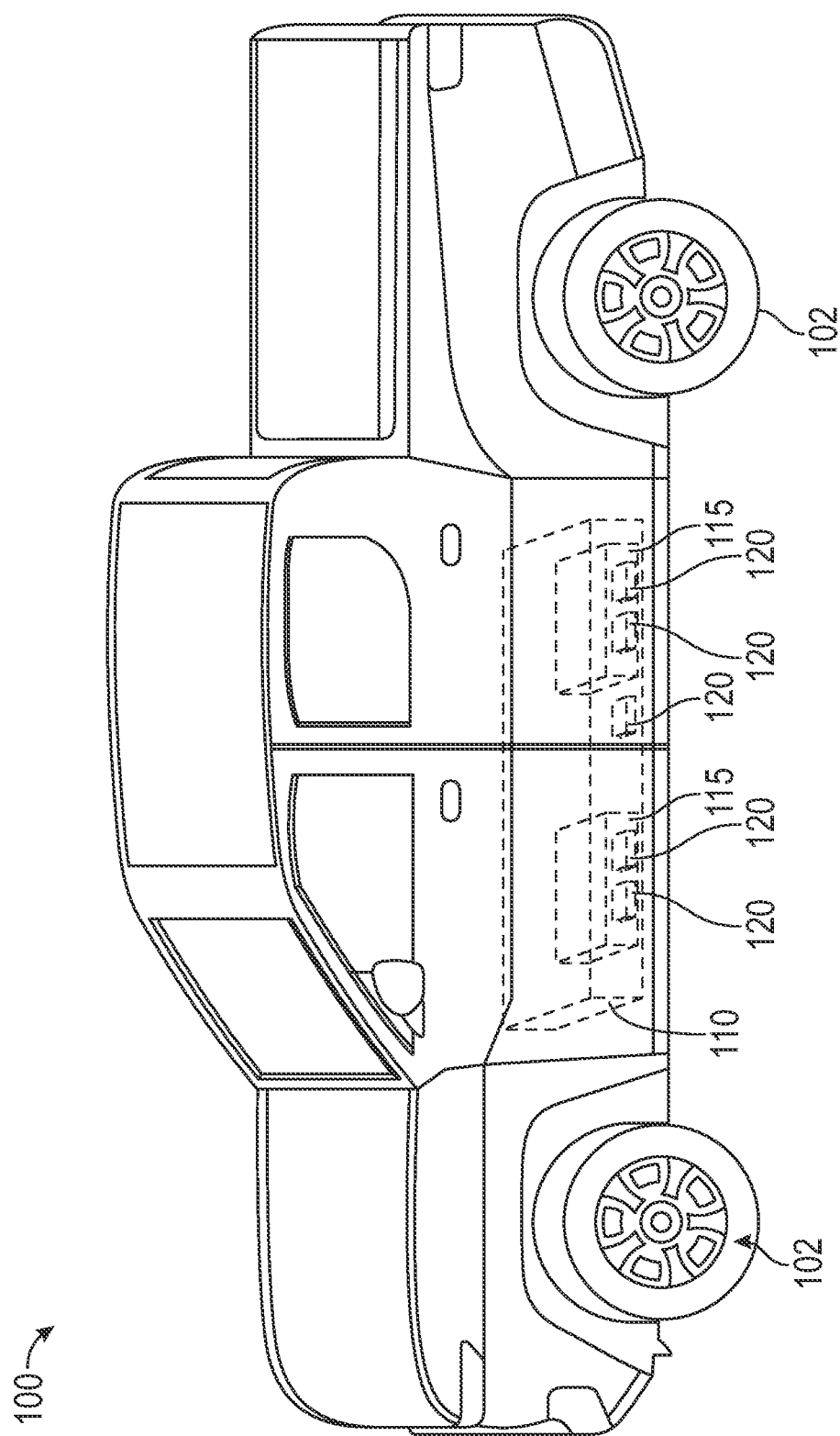
FIGS. 1A and 1B illustrate schematic perspective side views of example implementations of a vehicle having a battery pack in accordance with one or more implementations.

FIG. 1A is a diagram illustrating an example implementation of a moveable apparatus as described herein. In the example of FIG. 1A, a moveable apparatus is implemented as a vehicle 100. As shown, the vehicle 100 may include one or more battery packs, such as battery pack 110. The battery pack 110 may be coupled to one or more electrical systems of the vehicle 100 to provide power to the electrical systems.

In one or more implementations, the vehicle 100 may be an electric vehicle having one or more electric motors that drive the wheels 102 of the vehicle using electric power from the battery pack 110. In one or more implementations, the vehicle 100 may also, or alternatively, include one or more chemically powered engines, such as a gas-powered engine or a fuel cell powered motor. For example, electric vehicles can be fully electric or partially electric (e.g., hybrid or plug-in hybrid).

In the example of FIG. 1A, the vehicle 100 is implemented as a truck (e.g., a pickup truck) having a battery pack 110. As shown, the battery pack 110 may include one or more battery subassemblies, for example battery modules 115, which may include one or more battery cells 120. As shown in FIG. 1A, the battery pack 110 may also, or alternatively, include one or more battery cells 120 mounted directly in the battery pack 110 (e.g., in a cell-to-pack configuration). In one or more implementations, the battery pack 110 may be provided without any battery modules 115 and with the battery cells 120 mounted directly in the battery pack 110 (e.g., in a cell-to-pack configuration) and/or in other battery units that are installed in the battery pack 110. A vehicle battery pack can include multiple energy storage devices that can be arranged into such as battery modules or battery units. A battery subassembly, unit or module can include an assembly of cells that can be combined with other elements (e.g., structural frame, thermal management devices) that can protect the assembly of cells from heat, shock and/or vibrations.

For example, the battery cell 120 can be included a battery, a battery unit, a battery module and/or a battery pack to power components of the vehicle 100. For example, a battery cell housing of the battery cell 120 can be disposed in the battery module 115, the battery pack 110, a battery array, or other battery unit installed in the vehicle 100.

As discussed in further detail hereinafter, the battery cells 120 may be provided with a battery cell housing that can be provided with any of various outer shapes. The battery cell housing may be a rigid housing in some implementations (e.g., for cylindrical or prismatic battery cells). The battery cell housing may also, or alternatively, be formed as a pouch or other flexible or malleable housing for the battery cell in some implementations. In various other implementations, the battery cell housing can be provided with any other suitable outer shape, such as a triangular outer shape, a square outer shape, a rectangular outer shape, a pentagonal outer shape, a hexagonal outer shape, or any other suitable outer shape. In some implementations, the battery pack 110 may not include modules (e.g., the battery pack may be module-free). For example, the battery pack 110 can have a module-free or cell-to-pack configuration in which the battery cells 120 are arranged directly into the battery pack 110 without assembly into a battery module 115. In one or more implementations, the vehicle 100 may include one or more busbars, electrical connectors, or other charge collecting, current collecting, and/or coupling components to provide electrical power from the battery pack 110 to various systems or components of the vehicle 100. In one or more implementations, the vehicle 100 may include control circuitry such as a power stage circuit that can be used to convert DC power from the battery pack 110 into AC power for one or more components and/or systems of the vehicle (e.g., including one or more power outlets of the vehicle and/or the motor(s) that drive the wheels 102 of the vehicle). The power stage circuit can be provided as part of the battery pack 110 or separately from the battery pack 110 within the vehicle 100.

Figure 1B:
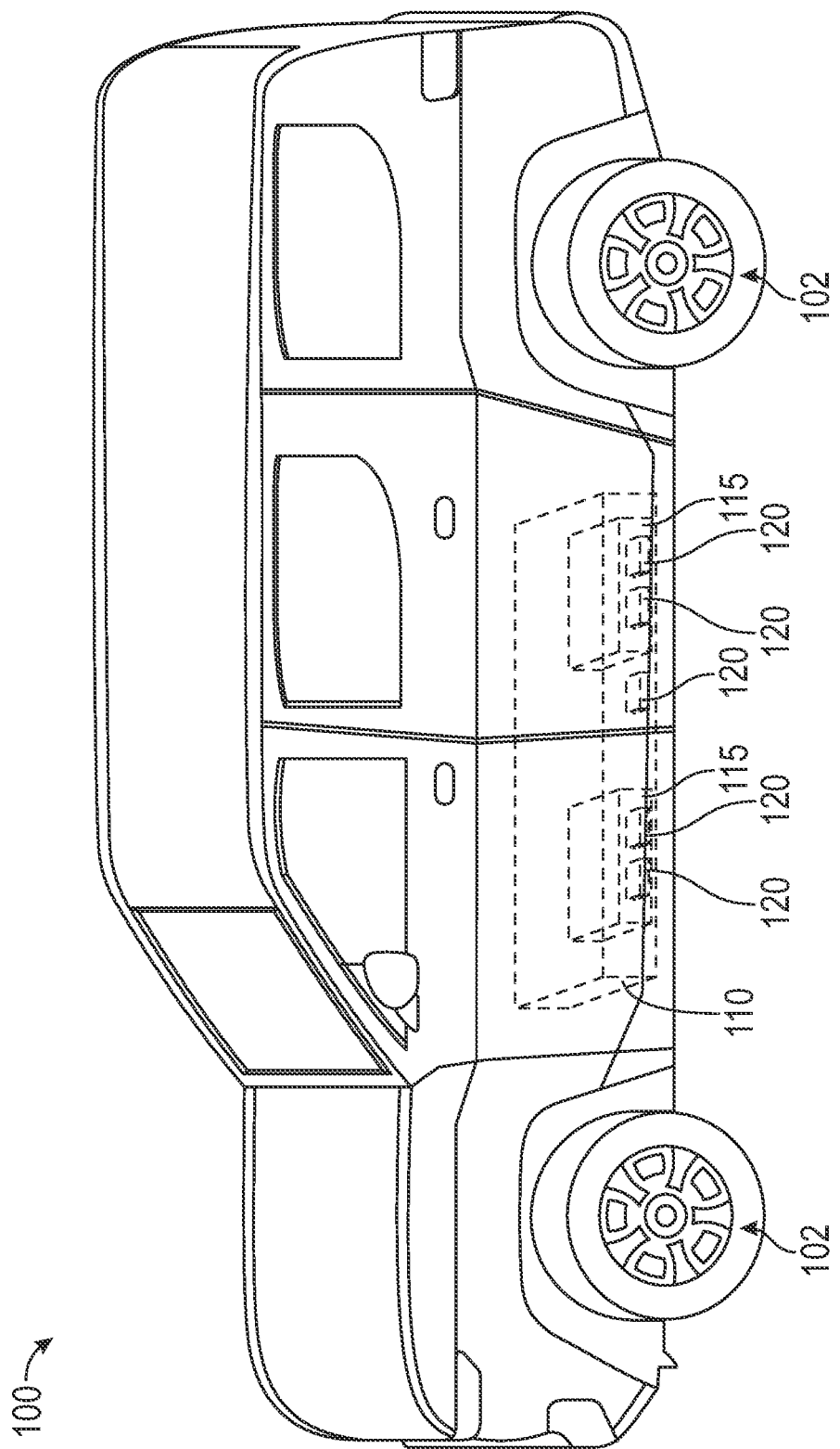

The example of FIG. 1A in which the vehicle 100 is implemented as a pickup truck having a truck bed at the rear portion thereof is merely illustrative. For example, FIG. 1B illustrates another implementation in which the vehicle 100 including the battery pack 110 is implemented as a sport utility vehicle (SUV), such as an electric sport utility vehicle. In the example of FIG. 1B, the vehicle 100 including the battery pack 110 may include a cargo storage area that is enclosed within the vehicle 100 (e.g., behind a row of seats within a cabin of the vehicle). In other implementations, the vehicle 100 may be implemented as another type of electric truck, an electric delivery van, an electric automobile, an electric car, an electric motorcycle, an electric scooter, an electric bicycle, an electric passenger vehicle, an electric passenger or commercial truck, a hybrid vehicle, an aircraft, a watercraft, and/or any other movable apparatus having a battery pack 110 (e.g., a battery pack or other battery unit that powers the propulsion or drive components of the moveable apparatus).

Figure 1C:
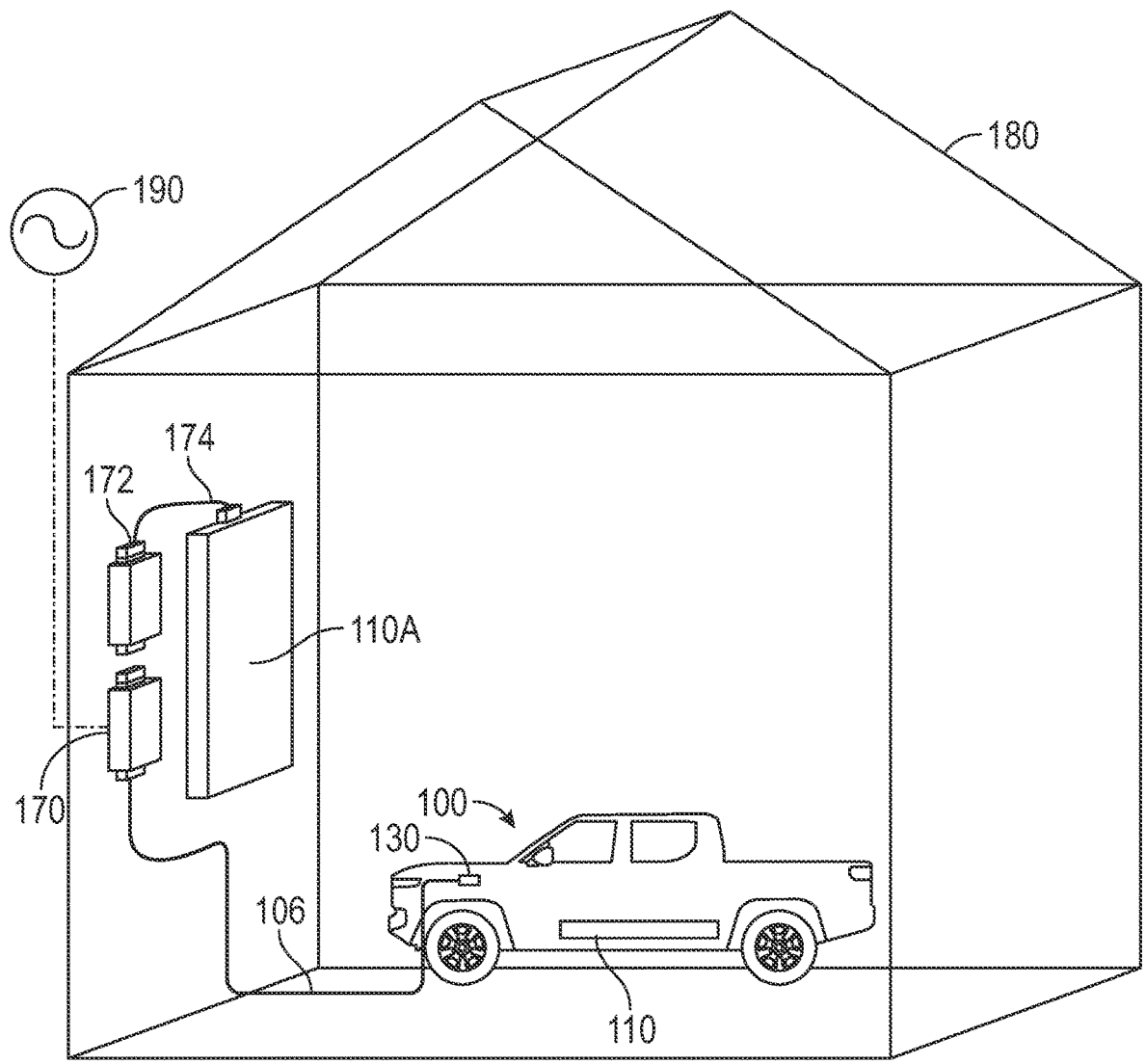
FIG. 1C illustrates a schematic perspective view of a building having a battery pack in accordance with one or more implementations.

In one or more implementations, a battery pack such as the battery pack 110, a battery module 115, a battery cell 120, and/or any other battery unit as described herein may also, or alternatively, be implemented as an electrical power supply and/or energy storage system in a building, such as a residential home or commercial building. For example, FIG. 1C illustrates an example in which a battery pack 110 is implemented in a building 180. For example, the building 180 may be a residential building, a commercial building, or any other building. As shown, in one or more implementations, a battery pack 110 may be mounted to a wall of the building 180.

As shown, the battery 110A that is installed in the building 180 may be couplable to the battery pack 110 in the vehicle 100, such as via: a cable/connector 106 that can be connected to the charging port 130 of the vehicle 100, electric vehicle supply equipment 170 (EVSE), a power stage circuit 172, and/or a cable/connector 174. For example, the cable/connector 106 may be coupled to the EVSE 170, which may be coupled to the battery 110A via the power stage circuit 172, and/or may be coupled to an external power source 190. In this way, either the external power source 190 or the battery 110A that is installed in the building 180 may be used as an external power source to charge the battery pack 110 in the vehicle 100 in some use cases. In some examples, the battery 110A that is installed in the building 180 may also, or alternatively, be coupled (e.g., via a cable/connector 174, the power stage circuit 172, and the EVSE 170) to the external power source 190. For example, the external power source 190 may be a solar power source, a wind power source, and/or an electrical grid of a city, town, or other geographic region (e.g., electrical grid that is powered by a remote power plant). During, for example, times when the battery pack 110 in the vehicle 100 is not coupled to the battery 110A that is installed in the building 180, the battery 110A that is installed in the building 180 can be coupled (e.g., using the power stage circuit 172 for the building 180) to the external power source 190 to charge up and store electrical energy. In some use cases, this stored electrical energy in the battery 110A that is installed in the building 180 can later be used to charge the battery pack 110 in the vehicle 100 (e.g., during times when solar power or wind power is not available, in the case of a regional or local power outage for the building 180, and/or during a period of high rates for access to the electrical grid).

In one or more implementations, the power stage circuit 172 may electrically couple the battery 110A that is installed in the building 180 to an electrical system of the building 180. For example, the power stage circuit 172 may convert DC power from the battery 110A into AC power for one or more loads in the building 180. For example, the battery 110A that is installed in the building 180 may be used to power one or more lights, lamps, appliances, fans, heaters, air conditioners, and/or any other electrical components or electrical loads in the building 180 (e.g., via one or more electrical outlets that are coupled to the battery 110A that is installed in the building 180). For example, the power stage circuit 172 may include control circuitry that is operable to switchably couple the battery 110A between the external power source 190 and one or more electrical outlets and/or other electrical loads in the electrical system of the building 180. In one or more implementations, the vehicle 100 may include a power stage circuit (not shown in FIG. 1C) that can be used to convert power received from the electric vehicle supply equipment 170 to DC power that is used to power/charge the battery pack 110 of the vehicle 100, and/or to convert DC power from the battery pack 110 into AC power for one or more electrical systems, components, and/or loads of the vehicle 100.

In one or more use cases, the battery 110A that is installed in the building 180 may be used as a source of electrical power for the building 180, such as during times when solar power or wind power is not available, in the case of a regional or local power outage for the building 180, and/or during a period of high rates for access to the electrical grid (as examples). In one or more other use cases, the battery pack 110 that is installed in the vehicle may be used to charge the battery 110A that is installed in the building 180 and/or to power the electrical system of the building 180 (e.g., in a use case in which the battery 110A that is installed in the building 180 is low on or out of stored energy and in which solar power or wind power is not available, a regional or local power outage occurs for the building 180, and/or a period of high rates for access to the electrical grid occurs (as examples)).

Figure 2A:
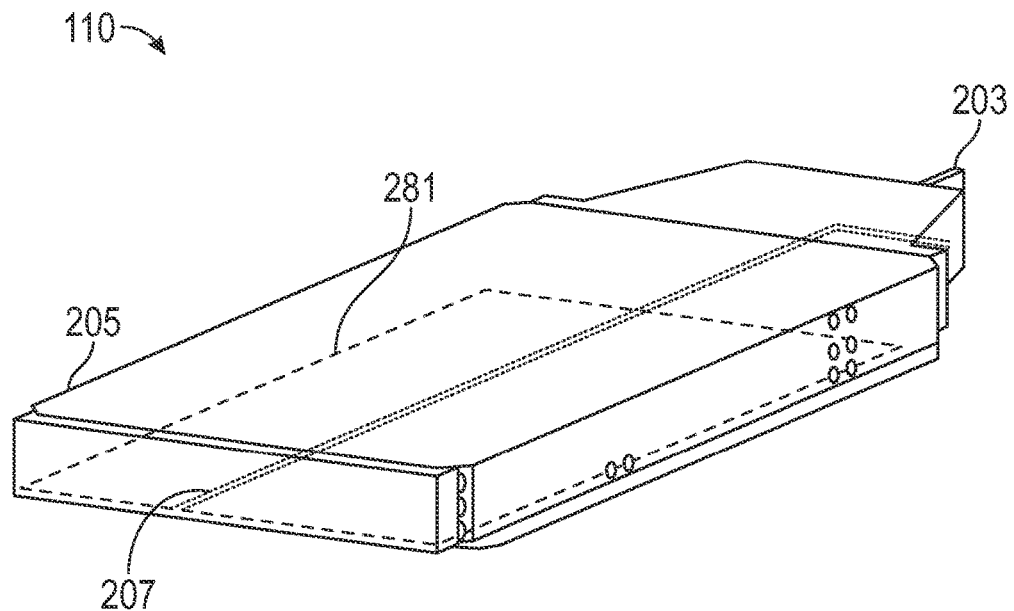
FIG. 2A illustrates a schematic perspective view of a battery pack in accordance with one or more implementations.

FIG. 2A depicts an example battery pack 110. Battery pack 110 may include multiple battery cells 120 (e.g., directly installed within the battery pack 110, or within batteries, battery units, and/or battery modules 115 as described herein) and/or battery modules 115, and one or more conductive coupling elements for coupling a voltage generated by the battery cells 120 to a power-consuming component, such as the vehicle 100 and/or an electrical system of a building 180. For example, the conductive coupling elements may include internal connectors and/or contactors that couple together multiple battery cells 120, battery units, batteries, and/or multiple battery modules 115 within the battery pack frame 205 to generate a desired output voltage for the battery pack 110. The battery pack 110 may also include one or more external connection ports, such as an electrical contact 203 (e.g., a high voltage terminal). For example, an electrical cable (e.g., cable/connector 106) may be connected between the electrical contact 203 and an electrical system of the vehicle 100 or the building 180, to provide electrical power to the vehicle 100 or the building 180.

As shown, the battery pack 110 may include a battery pack frame 205 (e.g., a battery pack housing or pack frame). For example, the battery pack frame 205 may house or enclose one or more battery modules 115 and/or one or more battery cells 120, and/or other battery pack components. In one or more implementations, the battery pack frame 205 may include or form a shielding structure on an outer surface thereof (e.g., a bottom thereof and/or underneath one or more battery module 115, battery units, batteries, and/or battery cells 120) to protect the battery module 115, battery units, batteries, and/or battery cells 120 from external conditions (e.g., if the battery pack 110 is installed in a vehicle 100 and the vehicle 100 is driven over rough terrain, such as off-road terrain, trenches, rocks, rivers, streams, etc.).

In one or more implementations, the battery pack 110 may include one or more thermal control structures 207 (e.g., cooling lines and/or plates and/or heating lines and/or plates). For example, thermal control structures 207 may couple thermal control structures and/or fluids to the battery modules 115, battery units, batteries, and/or battery cells 120 within the battery pack frame 205, such as by distributing fluid through the battery pack 110.

For example, the thermal control structures 207 may form a part of a thermal/temperature control or heat exchange system that includes one or more thermal components 281 such as plates or bladders that are disposed in thermal contact with one or more battery modules 115 and/or battery cells 120 disposed within the battery pack frame 205. For example, a thermal component 281 may be positioned in contact with one or more battery modules 115, battery units, batteries, and/or battery cells 120 within the battery pack frame 205. In one or more implementations, the battery pack 110 may include one or multiple thermal control structures 207 and/or other thermal components for each of several top and bottom battery module pairs. As shown, the battery pack 110 may include an electrical contact 203 (e.g., a high voltage connector) by which an external load (e.g., the vehicle 100 or an electrical system of the building 180) may be electrically coupled to the battery modules and/or battery cells in the battery pack 110.

Figure 2B:
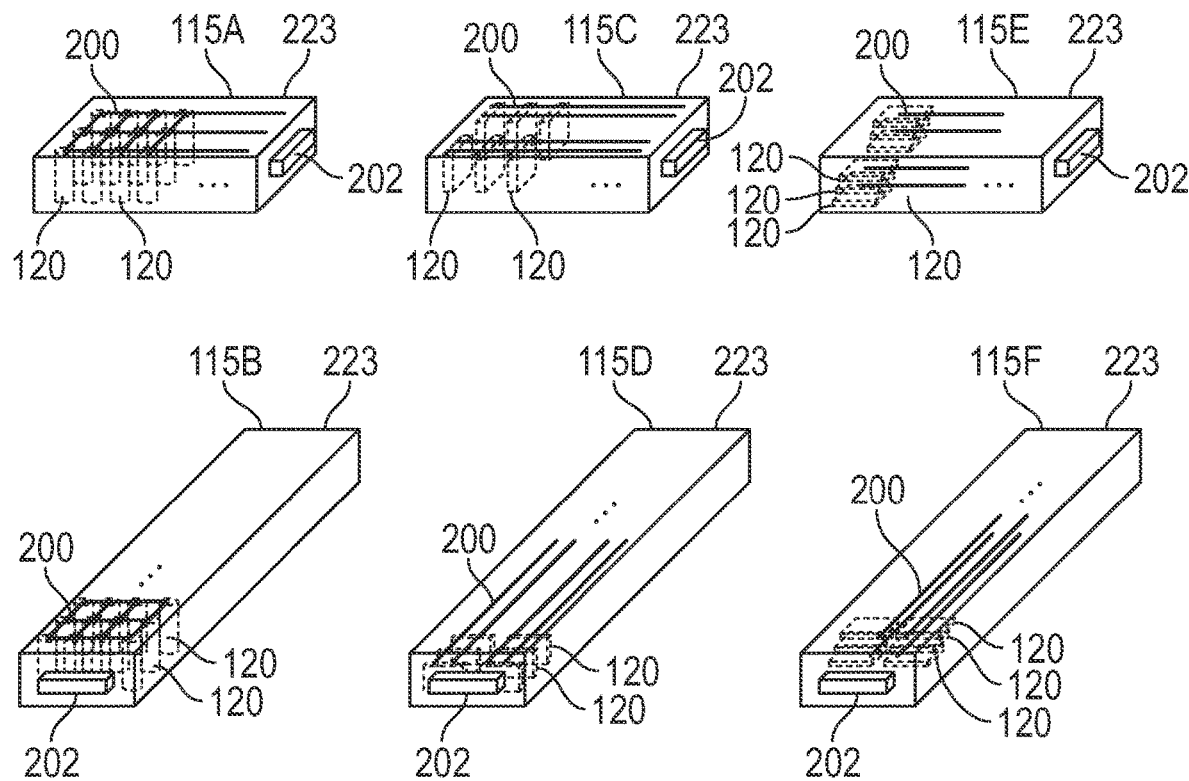
FIG. 2B illustrates schematic perspective views of various battery modules that may be included in a battery pack in accordance with one or more implementations.

FIG. 2B depicts various examples of battery modules 115 that may be disposed in the battery pack 110 (e.g., within the battery pack frame 205 of FIG. 2A). In the example of FIG. 2B, a battery module 115A is shown that includes a battery module housing 223 having a rectangular cuboid shape with a length that is substantially similar to its width. In this example, the battery module 115A includes multiple battery cells 120 implemented as cylindrical battery cells. In this example, the battery module 115A includes rows and columns of cylindrical battery cells that are coupled together by an interconnect structure 200 (e.g., a current connector assembly or CCA). For example, the interconnect structure 200 may couple together the positive terminals of the battery cells 120, and/or couple together the negative battery terminals of the battery cells 120. As shown, the battery module 115A may include a charge collector or bus bar 202. For example, the bus bar 202 may be electrically coupled to the interconnect structure 200 to collect the charge generated by the battery cells 120 to provide a high voltage output from the battery module 115A.

FIG. 2B also shows a battery module 115B having an elongate shape, in which the length of the battery module housing 223 (e.g., extending along a direction from a front end of the battery pack 110 to a rear end of the battery pack 110 when the battery module 115B is installed in the battery pack 110) is substantially greater than a width (e.g., in a transverse direction to the direction from the front end of the battery pack 110 to the rear end of the battery pack 110 when the battery module 115B is installed in the battery pack 110) of the battery module housing 223. For example, one or more battery modules 115B may span the entire front-to-back length of a battery pack within the battery pack frame 205. As shown, the battery module 115B may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115B.

In the implementations of battery module 115A and battery module 115B, the battery cells 120 are implemented as cylindrical battery cells. However, in other implementations, a battery module may include battery cells having other form factors, such as a battery cells having a right prismatic outer shape (e.g., a prismatic cell), or a pouch cell implementation of a battery cell. As an example, FIG. 2B also shows a battery module 115C having a battery module housing 223 having a rectangular cuboid shape with a length that is substantially similar to its width and including multiple battery cells 120 implemented as prismatic battery cells. In this example, the battery module 115C includes rows and columns of prismatic battery cells that are coupled together by an interconnect structure 200 (e.g., a current collector assembly or CCA). For example, the interconnect structure 200 may couple together the positive terminals of the battery cells 120 and/or couple together the negative battery terminals of the battery cells 120. As shown, the battery module 115C may include a charge collector or bus bar 202. For example, the bus bar 202 may be electrically coupled to the interconnect structure 200 to collect the charge generated by the battery cells 120 to provide a high voltage output from the battery module 115C.

FIG. 2B also shows a battery module 115D including prismatic battery cells and having an elongate shape, in which the length of the battery module housing 223 (e.g., extending along a direction from a front end of the battery pack 110 to a rear end of the battery pack 110 when the battery module 115D is installed in the battery pack 110) is substantially greater than a width (e.g., in a transverse direction to the direction from the front end of the battery pack 110 to the rear end of the battery pack 110 when the battery module 115D is installed in the battery pack 110) of the battery module housing 223. For example, one or more battery modules 115D having prismatic battery cells may span the entire front-to-back length of a battery pack within the battery pack frame 205. As shown, the battery module 115D may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115D.

As another example, FIG. 2B also shows a battery module 115E having a battery module housing 223 having a rectangular cuboid shape with a length that is substantially similar to its width and including multiple battery cells 120 implemented as pouch battery cells. In this example, the battery module 115C includes rows and columns of pouch battery cells that are coupled together by an interconnect structure 200 (e.g., a current collector assembly or CCA). For example, the interconnect structure 200 may couple together the positive terminals of the battery cells 120 and couple together the negative battery terminals of the battery cells 120. As shown, the battery module 115E may include a charge collector or bus bar 202. For example, the bus bar 202 may be electrically coupled to the interconnect structure 200 to collect the charge generated by the battery cells 120 to provide a high voltage output from the battery module 115E.

FIG. 2B also shows a battery module 115F including pouch battery cells and having an elongate shape in which the length of the battery module housing 223 (e.g., extending along a direction from a front end of the battery pack 110 to a rear end of the battery pack 110 when the battery module 115E is installed in the battery pack 110) is substantially greater than a width (e.g., in a transverse direction to the direction from the front end of the battery pack 110 to the rear end of the battery pack 110 when the battery module 115E is installed in the battery pack 110) of the battery module housing 223. For example, one or more battery modules 115E having pouch battery cells may span the entire front-to-back length of a battery pack within the battery pack frame 205. As shown, the battery module 115E may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115E.

In various implementations, a battery pack 110 may be provided with one or more of any of the battery modules 115A, 115B, 115C, 115D, 115E, and 115F. In one or more other implementations, a battery pack 110 may be provided without battery modules 115 (e.g., in a cell-to-pack implementation).

In one or more implementations, multiple battery modules 115 in any of the implementations of FIG. 2B may be coupled (e.g., in series) to a current collector of the battery pack 110. In one or more implementations, the current collector may be coupled, via a high voltage harness, to one or more external connectors (e.g., electrical contact 203) on the battery pack 110. In one or more implementations, the battery pack 110 may be provided without any battery modules 115. For example, the battery pack 110 may have a cell-to-pack configuration in which battery cells 120 are arranged directly into the battery pack 110 without assembly into a battery module 115 (e.g., without including a separate battery module housing 223). For example, the battery pack 110 (e.g., the battery pack frame 205) may include or define a plurality of structures for positioning of the battery cells 120 directly within the battery pack frame 205.

Figure 2C:
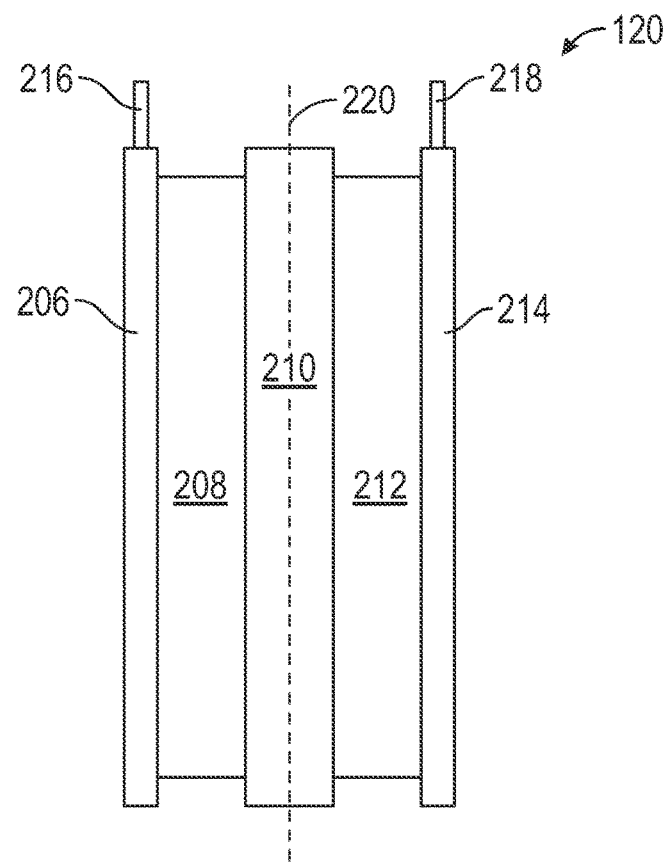
FIG. 2C illustrates a cross-sectional end view of a battery cell in accordance with one or more implementations.

FIG. 2C illustrates a cross-sectional end view of a portion of a battery cell 120. As shown in FIG. 2C, a battery cell 120 may include an anode 208, an electrolyte 210, and a cathode 212. As shown, the anode 208 may include or be electrically coupled to a first current collector 206 (e.g., a metal layer such as a layer of copper foil or other metal foil). As shown, the cathode 212 may include or be electrically coupled to a second current collector 214 (e.g., a metal layer such as a layer of aluminum foil or other metal foil). As shown, the battery cell 120 may include a first terminal 216 (e.g., a negative terminal) coupled to the anode 208 (e.g., via the first current collector 206) and a second terminal 218 (e.g., a positive terminal) coupled to the cathode (e.g., via the second current collector 214). In various implementations, the electrolyte 210 may be a liquid electrolyte layer or a solid electrolyte layer. In one or more implementations (e.g., implementations in which the electrolyte 210 is a liquid electrolyte layer), the battery cell 120 may include a separator layer 220 that separates the anode 208 from the cathode 212. In one or more implementations in which the electrolyte 210 is a solid electrolyte layer, the solid electrolyte layer may act as both separator layer and an electrolyte layer.

In one or more implementations, the battery cell 120 may be implemented as a lithium ion battery cell in which the anode 208 is formed from a carbonaceous material (e.g., graphite or silicon-carbon). In these implementations, lithium ions can move from the anode 208, through the electrolyte 210, to the cathode 212 during discharge of the battery cell 120 (e.g., and through the electrolyte 210 from the cathode 212 to the anode 208 during charging of the battery cell 120). For example, the anode 208 may be formed from a graphite material that is coated on a copper foil corresponding to the first current collector 206. In these lithium ion implementations, the cathode 212 may be formed from one or more metal oxides (e.g., a lithium cobalt oxide, a lithium manganese oxide, a lithium nickel manganese cobalt oxide (NMC), or the like) and/or a lithium iron phosphate. As shown, the battery cell 120 may include a separator layer 220 that separates the anode 208 from the cathode 212. In an implementation in which the battery cell 120 is implemented as a lithium-ion battery cell, the electrolyte 210 may include a lithium salt in an organic solvent. The separator layer 220 may be formed from one or more insulating materials (e.g., a polymer such as polyethylene, polypropylene, polyolefin, and/or polyamide, or other insulating materials such as rubber, glass, cellulose or the like). The separator layer 220 may prevent contact between the anode 208 and the cathode 212, and may be permeable to the electrolyte 210 and/or ions within the electrolyte 210. In one or more implementations, the battery cell 120 may be implemented as a lithium polymer battery cell having a dry solid polymer electrolyte and/or a gel polymer electrolyte.

Although some examples are described herein in which the battery cells 120 are implemented as lithium-ion battery cells, some or all of the battery cells 120 in a battery module 115, battery pack 110, or other battery or battery unit may be implemented using other battery cell technologies, such as nickel-metal hydride battery cells, sodium ion battery cells, lead-acid battery cells, and/or ultracapacitor cells. For example, in a nickel-metal hydride battery cell, the anode 208 may be formed from a hydrogen-absorbing alloy and the cathode 212 may be formed from a nickel oxide-hydroxide. In the example of a nickel-metal hydride battery cell, the electrolyte 210 may be formed from an aqueous potassium hydroxide in one or more examples.

The battery cell 120 may be implemented as a lithium sulfur battery cell in one or more other implementations. For example, in a lithium sulfur battery cell, the anode 208 may be formed at least in part from lithium, the cathode 212 may be formed from at least in part form sulfur, and the electrolyte 210 may be formed from a cyclic ether, a short-chain ether, a glycol ether, an ionic liquid, a super-saturated salt-solvent mixture, a polymer-gelled organic media, a solid polymer, a solid inorganic glass, and/or other suitable electrolyte materials.

Figure 2D:
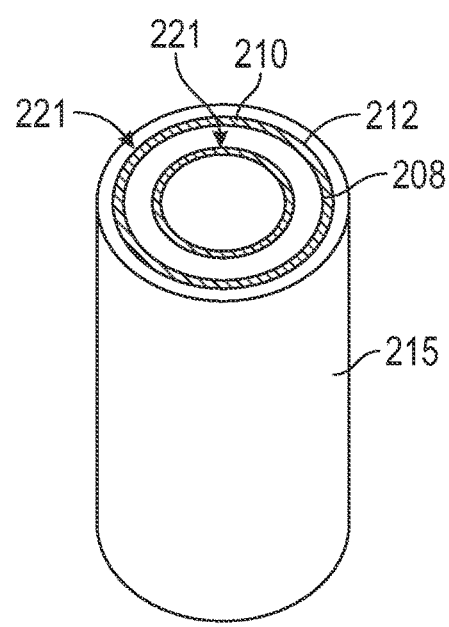
FIG. 2D illustrates a cross-sectional perspective view of a cylindrical battery cell in accordance with one or more implementations.

In various implementations, the anode 208, the electrolyte 210, and the cathode 212 of FIG. 2C can be packaged into a battery cell housing having any of various shapes, and/or sizes, and/or formed from any of various suitable materials. For example, battery cells 120 can have a cylindrical, rectangular, square, cubic, flat, pouch, elongated, or prismatic outer shape. As depicted in FIG. 2D, for example, a battery cell such as the battery cell 120 may be implemented as a cylindrical cell. In the example of FIG. 2D, the battery cell 120 includes a cell housing 215 having a cylindrical outer shape. For example, the anode 208, the electrolyte 210, and the cathode 212 may be rolled into one or more substantially cylindrical windings 221. As shown, one or more windings 221 of the anode 208, the electrolyte 210, and the cathode 212 (e.g., and/or one or more separator layers such as separator layer 220) may be disposed within the cell housing 215. For example, a separator layer may be disposed between adjacent ones of the windings 221. However, the cylindrical cell implementation of FIG. 2D is merely illustrative, and other implementations of the battery cells 120 are contemplated.

Figure 2E:
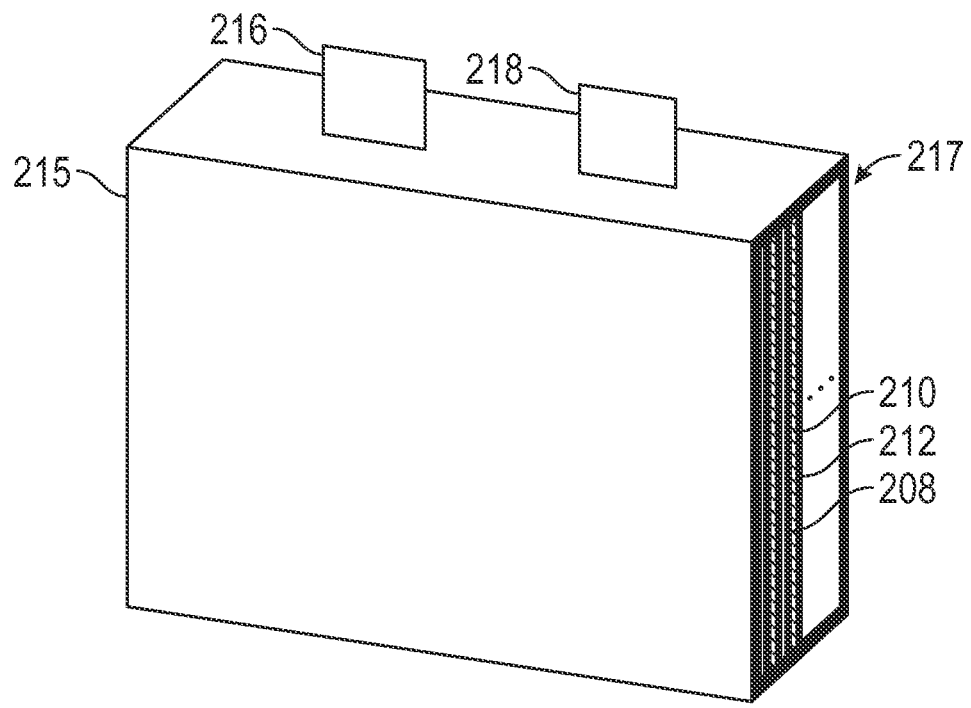
FIG. 2E illustrates a cross-sectional perspective view of a prismatic battery cell in accordance with one or more implementations.

For example, FIG. 2E illustrates an example in which the battery cell 120 is implemented as a prismatic cell. As shown in FIG. 2E, the battery cell 120 may have a cell housing 215 having a right prismatic outer shape. As shown, one or more layers of the anode 208, the cathode 212, and the electrolyte 210 disposed therebetween may be disposed (e.g., with separator materials between the layers) within the cell housing 215 having the right prismatic shape. As examples, multiple layer of the anode 208, electrolyte 210, and cathode 212 can be stacked (e.g., with separator materials between each layer), or a single layer of the anode 208, electrolyte 210, and cathode 212 can be formed into a flattened spiral shape and provided in the cell housing 215 having the right prismatic shape. In the implementation of FIG. 2E, the cell housing 215 has a relatively thick cross-sectional width 217 and is formed from a rigid material. For example, the cell housing 215 in the implementation of FIG. 2E may be formed from a welded, stamped, deep drawn, and/or impact extruded metal sheet, such as a welded, stamped, deep drawn, and/or impact extruded aluminum sheet. For example, the cross-sectional width 217 of the cell housing 215 of FIG. 2E may be as much as, or more than 1 millimeter (mm) to provide a rigid housing for the prismatic battery cell. In one or more implementations, the first terminal 216 and the second terminal 218 in the prismatic cell implementation of FIG. 2E may be formed from a feedthrough conductor that is insulated from the cell housing 215 (e.g., a glass to metal feedthrough) as the conductor passes through to cell housing 215 to expose the first terminal 216 and the second terminal 218 outside the cell housing 215 (e.g., for contact with an interconnect structure 200 of FIG. 2B). However, this implementation of FIG. 2E is also illustrative and yet other implementations of the battery cell 120 are contemplated.

Figure 2F:
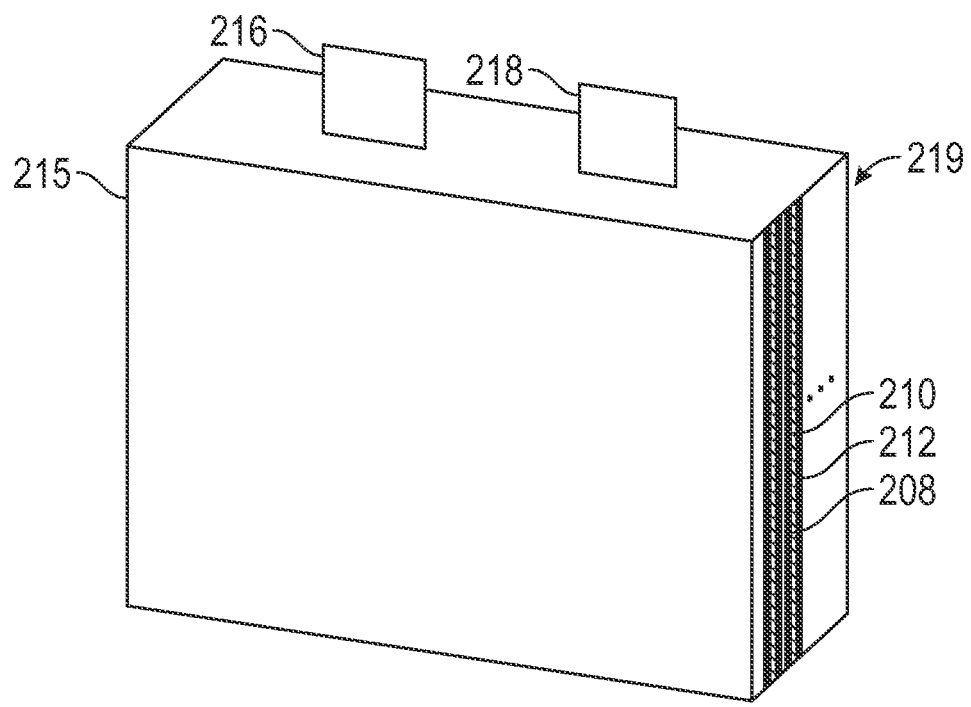
FIG. 2F illustrates a cross-sectional perspective view of a pouch battery cell in accordance with one or more implementations.

For example, FIG. 2F illustrates an example in which the battery cell 120 is implemented as a pouch cell. As shown in FIG. 2F, one or more layers of the anode 208, the cathode 212, and the electrolyte 210 disposed therebetween may be disposed (e.g., with separator materials between the layers) within the cell housing 215 that forms a flexible or malleable pouch housing. In the implementation of FIG. 2F, the cell housing 215 has a relatively thin cross-sectional width 219. For example, the cell housing 215 in the implementation of FIG. 2F may be formed from a flexible or malleable material (e.g., a foil, such as a metal foil, or film, such as an aluminum-coated plastic film). For example, the cross-sectional width 219 of the cell housing 215 of FIG. 2F may be as low as, or less than 0.1 mm, 0.05 mm, 0.02 mm, or 0.01 mm to provide flexible or malleable housing for the pouch battery cell. In one or more implementations, the first terminal 216 and the second terminal 218 in the pouch cell implementation of FIG. 2F may be formed from conductive tabs (e.g., foil tabs) that are coupled (e.g., welded) to the anode 208 and the cathode 212 respectively, and sealed to the pouch that forms the cell housing 215 in these implementations. In the examples of FIGS. 2C, 2E, and 2F, the first terminal 216 and the second terminal 218 are formed on the same side (e.g., a top side) of the battery cell 120. However, this is merely illustrative and, in other implementations, the first terminal 216 and the second terminal 218 may formed on two different sides (e.g., opposing sides, such as a top side and a bottom side) of the battery cell 120. The first terminal 216 and the second terminal 218 may be formed on a same side or difference sides of the cylindrical cell of FIG. 2D in various implementations.

In one or more implementations, a battery module 115, a battery pack 110, a battery unit, or any other battery may include some battery cells 120 that are implemented as solid-state battery cells and other battery cells 120 that are implemented with liquid electrolytes for lithium-ion or other battery cells having liquid electrolytes. One or more of the battery cells 120 may be included a battery module 115 or a battery pack 110, such as to provide an electrical power supply for components of the vehicle 100, the building 180, or any other electrically powered component or device. The cell housing 215 of the battery cell 120 can be disposed in the battery module 115, the battery pack 110, or installed in any of the vehicle 100, the building 180, or any other electrically powered component or device.

Figure 3:
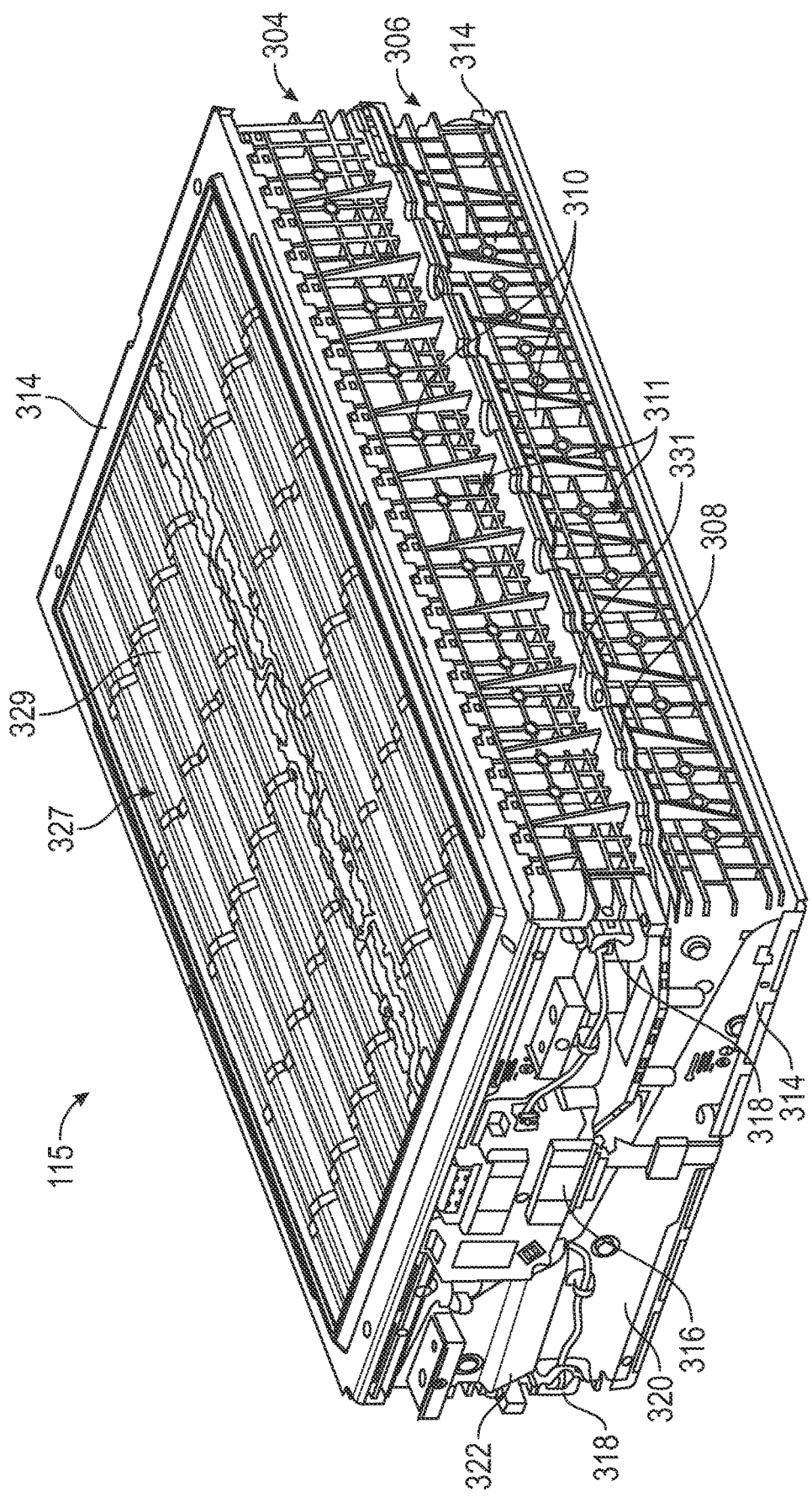
FIG. 3 illustrates a perspective view of a battery module in accordance with one or more implementations.

FIG. 3 illustrates a perspective view of a battery module in accordance with one or more implementations. In the example of FIG. 3, the battery module 115 includes a top submodule 304 and a bottom submodule 306. As shown, each of the top submodule 304 and the bottom submodule 306 may include a cell carrier 310. In one or more implementations, each cell carrier 310 may be a monolithic unitary body (e.g., a molded body formed from plastic and/or other materials), and may include structural features 311 along the sidewalls thereof. These structural features 311 may reinforce the strength of the sidewalls of the carrier, and thereby reduce or eliminate the need for additional structural reinforcing components for the battery module 115, such as shear walls attached to the cell carriers 310. Also visible in FIG. 3 is a cold plate 308 that is disposed between the top submodule 304 and the bottom submodule 306. The cold plate 308 may be in thermal contact with battery cells (not visible in FIG. 3) in the top submodule 304 and battery cells (not visible in FIG. 3) in the bottom submodule 306, to provide thermal control for both the top submodule 304 and the bottom submodule 306.

FIG. 3 also illustrates a potting dam 314 that may be disposed on a top and/or a bottom of the battery module 115. As shown, the potting dam 314 may extend around, and cover, a peripheral portion of the top surface of the battery module (e.g., a top surface of the top submodule 304 in FIG. 3), and may include an opening, such as a central opening 327. Portions of an additional potting dam 314 on the bottom surface of the battery module (e.g., on a top surface of the bottom submodule 306) are also visible in FIG. 3. As shown, a potting material 329 may cover a remaining portion of the top surface of the top submodule 304 within the central opening 327 of the potting dam 314. In one or more implementations, the potting material may be a syntactic potting material. For example, and as described in further detail hereinafter, the potting material 329 may be poured or otherwise dispensed onto the top surface of the top submodule 304 (e.g., onto a surface of a current collector assembly, CCA, of the top submodule 304) via the central opening 327, and the potting dam 314 may prevent the potting material 329 from flowing over the edges of the top submodule 304. In one or more implementations, and as described in further detail hereinafter, the potting material 329 may be allowed to cure, or partially cure, and the battery module 115 may be flipped over to apply additional potting material within a central opening (not visible in FIG. 3) of the additional potting dam 314 that is attached to the bottom submodule 306.

FIG. 3 also illustrates how one or more mechanical structures and/or electrical components can be mounted along a side of the battery module 115. For example, FIG. 3 illustrates how the battery module 115 may include a balancing voltage and temperature (BVT) module 316 to which multiple thermistor assemblies 318 are communicatively coupled. The BVT can be a modular assembly of various electrical components to monitor or control components of the battery subassembly. For example, the BVT can include a circuit board that is attached to the housing of the BVT. The BVT can have various connectors to couple with, for example, a thermistor that can measure a temperature of the battery subassembly, battery module and/or a battery cell thereof, a voltage sensor or balancer that can sense or control voltage that flows through the battery subassembly, battery module and/or a battery cell thereof, or a communication device that can receive, transmit, or analyze data associated with the battery subassembly, battery module and/or a battery cell thereof. Also shown in FIG. 3 are a busbar 320 (e.g., a positive busbar) that is electrically coupled to first terminals (e.g., the positive terminals) of the battery cells of the top submodule 304 and the bottom submodule 306, and a busbar 322 (e.g., a negative busbar) that is electrically coupled to second terminals (e.g., the negative terminals) of the battery cells of the top submodule 304 and the bottom submodule 306. The potting dam 314 may help to prevent potting material 329 from flowing over the edge of the battery module 115 onto the BVT 316, the thermistor assemblies 318, the busbar 320 or the busbar 322, which may prevent damage to the BVT 316, the thermistor assemblies 318, the busbar 320 or the busbar 322 that could be caused by potting material on the BVT 316, the thermistor assemblies 318, the busbar 320 or the busbar 322.

FIG. 3 also illustrates how the cell carriers 310 may each include a flange 331. The flange 331 may be used as a mounting surface for mounting the battery module 115 in a battery pack 110. The potting dam 314 may help to prevent potting material 329 from flowing over the edge of the battery module 115 onto the flange 331, which may prevent assembly issues that could be caused by potting material on the flange 331.

Figure 4:
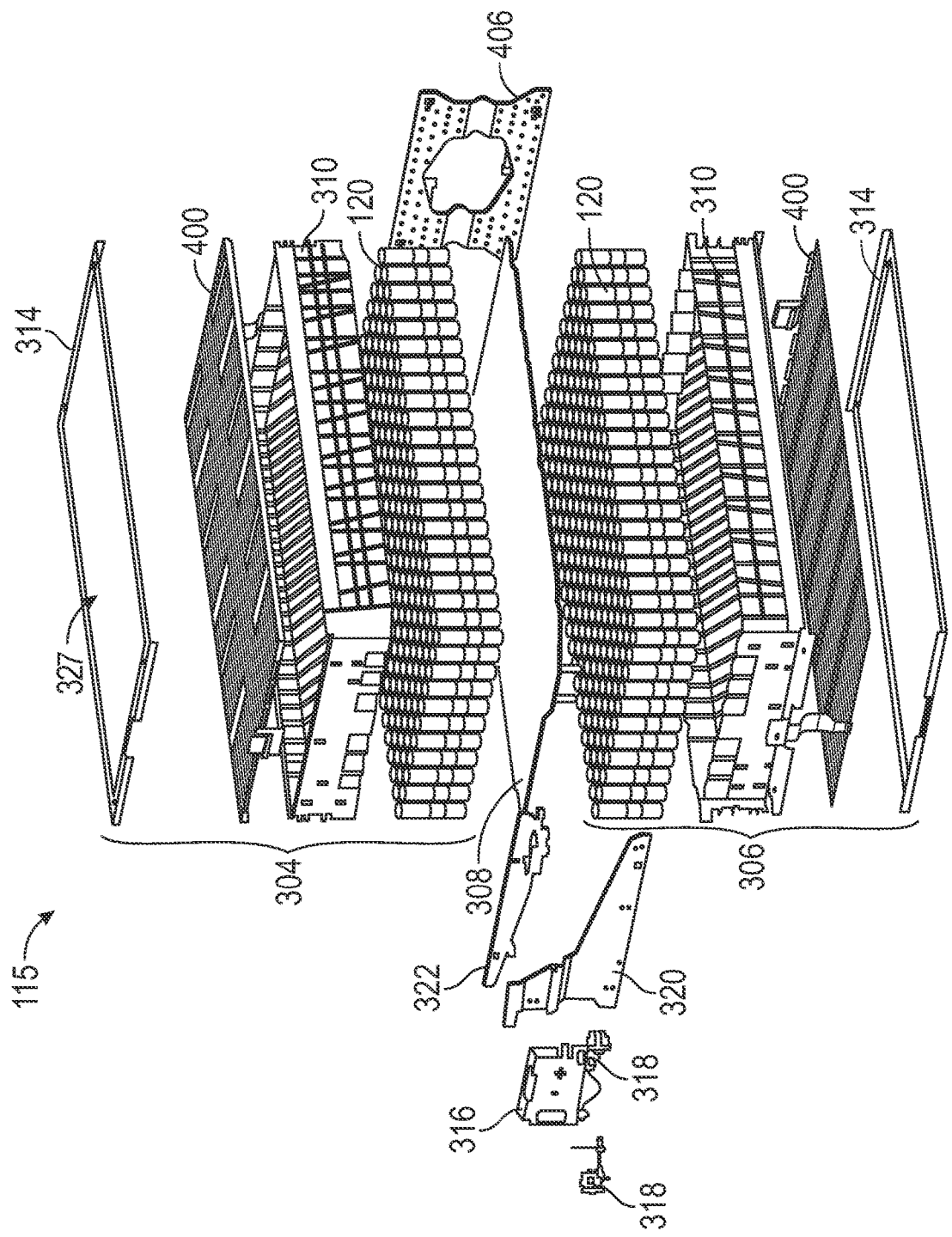
FIG. 4 illustrates an exploded perspective view of the battery module of FIG. 3 in accordance with one or more implementations.

FIG. 4 illustrates an exploded perspective view of the battery module 115 of FIG. 3, in which the battery cells 120 of the top submodule 304 and the battery cells 120 of the bottom submodule 306 can be seen. In one or more examples described herein, the battery module 115, a subset of the components of the battery module 115 (e.g., the top submodule 304, the bottom submodule 306, and/or another subset of the components of the battery module) shown in FIG. 3 and/or FIG. 4, or any other grouping of battery cells (e.g., including a battery pack that includes multiple battery modules and/or other battery subassemblies) may be referred to as a battery subassembly.

In the example of FIG. 4, two current collector assemblies (CCAs) 400 are also visible which, when the battery module 115 is assembled, connect the terminals of the battery cells 120 of the top submodule 304 and the bottom submodule 306 to the busbar 320 and the busbar 322. As show, the CCAs 400 may form respective top and bottom surfaces of the battery module 115 before potting material 329 is applied thereto. As shown in FIG. 4, a series busbar 406 may also be provided (e.g., on an opposing end of the cell carriers 310 from the end of the cell carriers at which the busbar 320 and the busbar 322 are mounted). For example, the series busbar 406 may electrically couple the battery cells 120 of the top submodule 304 to the battery cells 120 of the bottom submodule 306. As shown, a potting dam 314 may be provided for the top submodule 304 and a potting dam 314 may be provided for the bottom submodule 306.

In one or more implementations, the battery cells 120 of the top submodule 304 may be inserted into a crate structure formed by the cell carrier 310 of the top submodule 304, and the battery cells 120 of the bottom submodule 306 may be inserted into a crate structure formed by the cell carrier 310 of the bottom submodule 306. As shown in FIGS. 3 and 4, the orientation of the cell carrier 310 and the battery cells 120 of the top submodule 304 may be substantially opposite (e.g., upside down with respect) to the orientation of the cell carrier 310 and the battery cells 120 of the bottom submodule 306. In this way, the single cold plate 308 can be in thermal contact with the same ends (e.g., bottom ends) of the battery cells 120 of both the top and bottom submodules, and provide substantially symmetric thermal contact with the top and bottom submodules.

Figure 5:
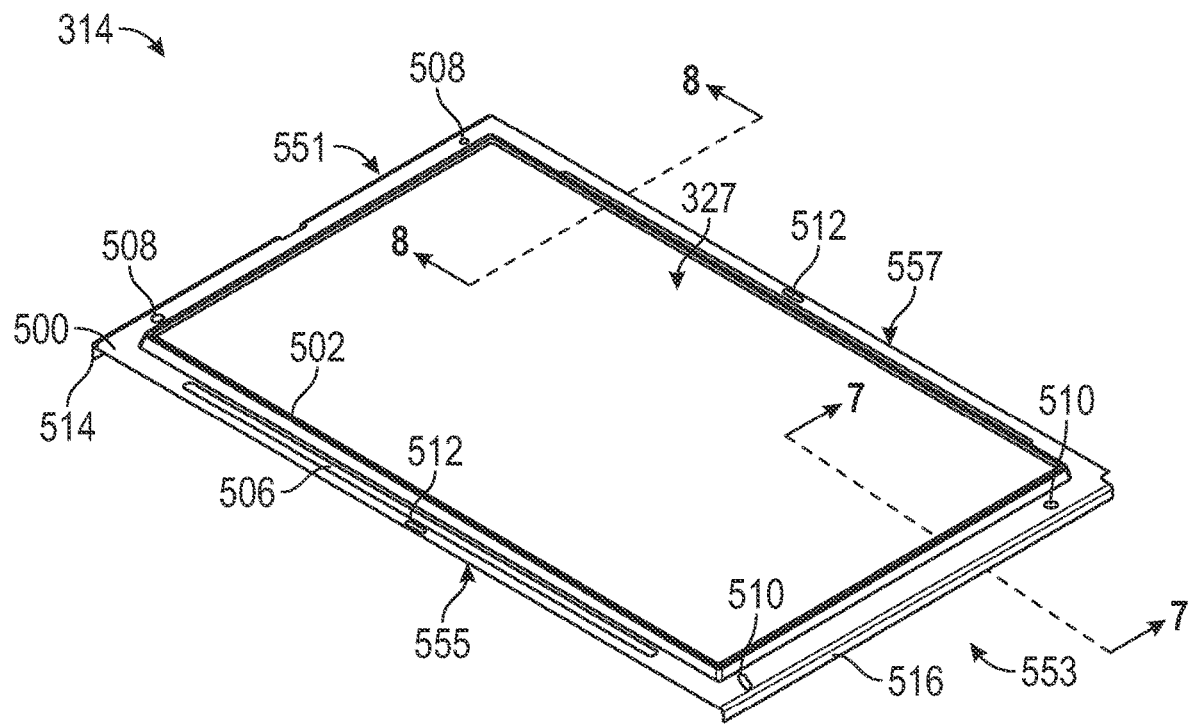
FIG. 5 illustrates a top perspective view of the potting dam of FIGS. 3 and 4 in accordance with one or more implementations.

FIG. 5 illustrates a top perspective view of a potting dam 314 in accordance with one or more implementations. As shown in FIG. 5, the potting dam 314 may include a peripheral portion 500 (also referred to herein as a peripheral). The peripheral portion 500 may be configured to cover a peripheral portion of an electrical structure, such as a CCA 400 of the battery subassembly 115. As shown, the potting dam 314 may also include a wall 502 that extends from the peripheral portion 500. For example, the wall 502 may extend (e.g., upward) from the peripheral portion at an angle (e.g., a ninety degree angle, or an obtuse angle greater than ninety degrees). As shown, the central opening 327 may be defined by the wall 502 (e.g., by wall 502 that extends around the four sides of the potting dam 314, thereby defining an opening interior to the four-sided wall). For example, the wall 502 may be configured (e.g., sized, shaped, and/or positioned) to dam the potting material 329 when the potting material 329 is provided onto the CCA 400 via the central opening 327. For example, damming the potting material 329 may include blocking, restricting, clogging, choking, obstructing, occluding, and/or otherwise impeding the flow of the potting material 329, such as to cause accumulation of the potting material 329 on one side of the wall 502 (e.g., within the central opening 327 and on the surface of the CCA 400). As shown, the wall 502 may extend around and define an entire periphery of the central opening 327. As shown, the peripheral portion 500 may extend around the entire periphery of the wall 502.

The potting dam 314 may include a first overhang 514 that extends from the peripheral portion 500 of the potting dam along a first edge (e.g., edge 551) of the potting dam 314, and a second overhang 516 that extends from the peripheral portion 500 of the potting dam 314 along a second edge (e.g., edge 553) of the potting dam 314.

As shown in FIG. 5, the potting dam 314 may have one or more long edges (e.g., edges 555 and 557) that are longer than one or more relatively short edges (e.g., edges 551 and 553). As shown, the overhangs 514 and 516 may be provided on the (e.g., short) edges 551 and 553). For example, the overhangs 514 and 516 may be provided on the edges of the potting dam 314 that are to be mounted adjacent to the ends of the battery module 115 on which electrical circuitry (e.g., the BVT 316, the thermistor assemblies 318, the busbar 320, the busbar 322, and/or the busbar 406) are mounted (e.g., to provide additional protection against overflow of the potting material 329 on those edges. FIG. 5 also shows a stiffener 506 (e.g., a ridge) on each of the (e.g., long) edges 555 and 557. For example, the potting dam may be formed from a thin layer (e.g., between 0. 1 mm and 3 mm thick) of polymer (e.g., PET and/or recycled PET), and the stiffener(s) 506 may help to avoid bending, folding, lifting, or other deformations or displacements of the potting dam during assembly of the battery module 115. In various implementations, the potting dam 314 may be formed by injection molding, or in a thermoform process.

As shown in FIG. 5, the potting dam 314 may include one or more openings in the peripheral portion 500. For example, the openings in the peripheral portion 500 may be configured to align with openings in other parts of the battery module 115 (e.g., the CCA 400 and/or the cell carrier 310) and to receive fasteners that extend therethrough to attach the potting dam 314 to the battery module 115 (e.g., to the CCA 400 and the cell carrier 310). In the example of FIG. 5, the potting dam 314 includes openings 508 on a short edge (e.g., edge 551), openings 510 on an opposing short edge (e.g., edge 553), and openings 512 on the long edges (e.g., edges 555 and 557). Providing the openings 512 on the long edges (e.g., edges 555 and 557) may help to prevent the long edges of the potting dam 314 from being raised away from the surface of the battery module 115 by the potting material 329 (e.g., as the potting material 329 is poured or dispensed via the central opening 327), such as by allowing the long edges of the potting dam 314 to be fastened to the battery module 115 via the openings 512 (e.g., prior to application of the potting material).

In one or more implementations, the potting dam 314 may be described has including a first edge (e.g., edge 555), a second edge (e.g., edge 551) perpendicular to the first edge, a third edge (e.g., edge 557) parallel to and separated by the central opening 327 from the first edge, and a fourth edge (e.g., edge 553) parallel to and separated by the central opening 327 from the second edge. As shown, the potting dam 314 may also include a first stiffener 506 that extends along a portion of the peripheral portion 500 of the potting dam 314 on the first edge (e.g., edge 555), and a second stiffener 506 that extends along a portion of the peripheral portion 500 of the potting dam 314 on the third edge (e.g., edge 557). In this example, the first edge (e.g., edge 555) and the third edge (e.g., edge 557) have first length, the second edge (e.g., edge 551) and the fourth edge (e.g., edge 553) have a second length, and the first length is greater than the second length. In one or more implementations, the potting dam 314 includes a first opening (e.g., an opening 512) on the first edge (e.g., edge 555) and a second opening (e.g., another opening 512) on the second edge (e.g., edge 557), the first opening and the second opening each configured to receive a fastener (see, e.g., fastener 908 of FIG. 9) for securing the potting dam 314 to the battery subassembly.

Figure 6:
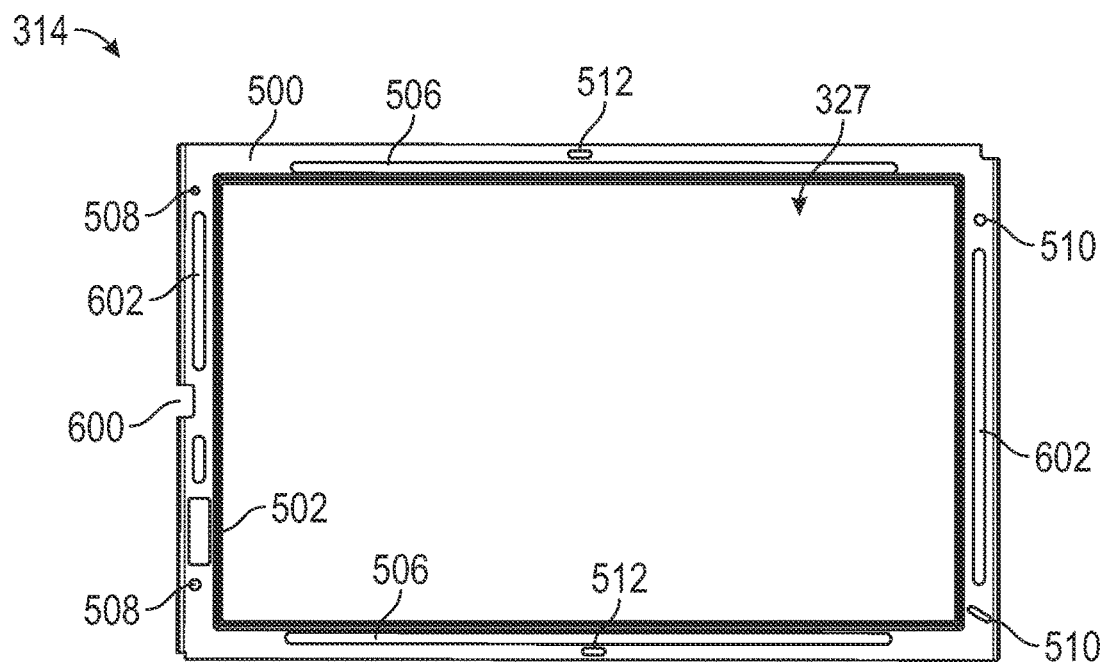
FIG. 6 illustrates a top view of the potting dam of FIGS. 3 and 4 in accordance with one or more implementations.

FIG. 6 illustrates a top view of the potting dam 314 in which the openings 508, 510, and 512, and the stiffeners 506 can be seen. FIG. 6 also shows how the potting dam 314 may include a notch 600 in one of the edges (e.g., the edge 551). For example, the notch 600 may be provided to accommodate an electrical component and/or cable that extends around the edge of the battery module (e.g., to connect the CCA 400 to one or more of the busbars on the side of the cell carrier 310). FIG. 6 also shows how the potting dam 314 may include one or more ribs 602 on the peripheral portion (e.g., along portions of the short edges, such as edges 551 and 552, of the potting dam 314. For example, the ribs 602 may provide additional protection against flow of the potting material 329 over the corresponding edges of the battery module (e.g., where electrical components such as busbars and the like may be mounted).

Figure 7:
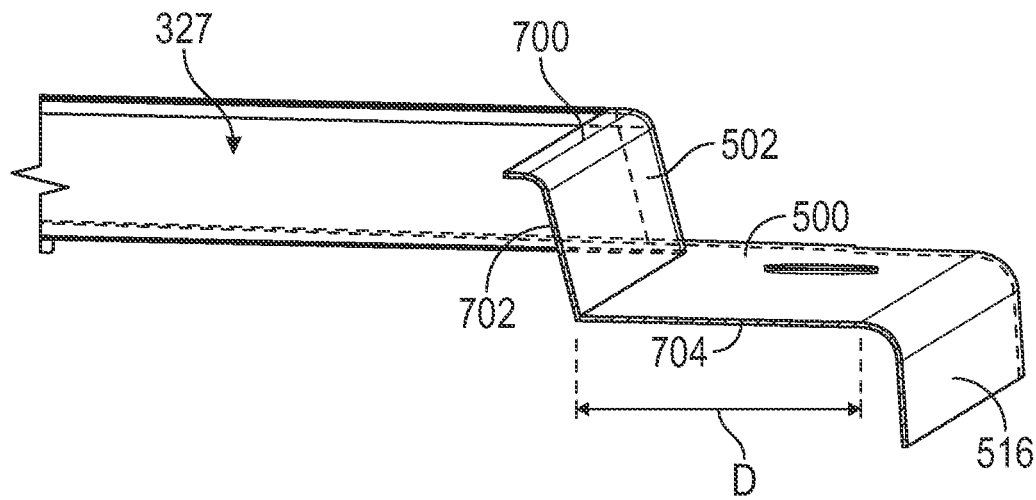
FIG. 7 illustrates a cross-sectional view of the potting dam of FIGS. 3 and 4 in accordance with one or more implementations.
Figure 8:
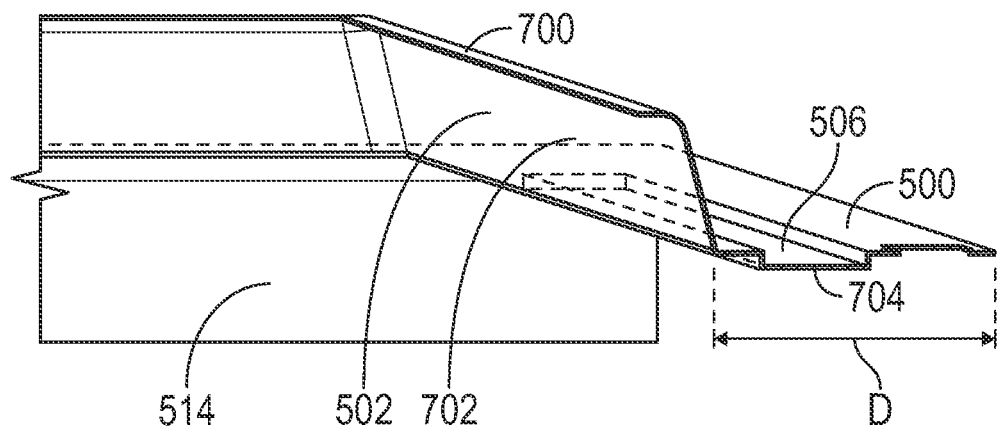
FIG. 8 illustrates another cross-sectional view of the potting dam of FIGS. 3 and 4 in accordance with one or more implementations.

FIGS. 7 and 8 show cross-sectional views of the potting dam 314 along the lines A-A and B-B, respectively of FIG. 5. For example, FIG. 7 illustrates a cross-section through the edge 553, in which the peripheral portion 500, the wall 502 extending from the peripheral portion 500 (e.g., at an obtuse angle), and the overhang 516 can be seen. When, for example, a potting material 329 is poured or otherwise dispensed into the opening 327 onto a surface of the battery module 115 (not shown in FIG. 7), the potting material 329 may flow up against an inner surface 702 of the wall 502. The inner surface of the wall 502 may block or dam the flow of the potting material, a portion of which may flow under the peripheral portion 500.

FIG. 7 also shows how the peripheral portion 500 may extend a distance, D, from the wall 502 (e.g., toward the edge of the CCA when the potting dam 314 is installed on the battery module 115). For example, the distance, D, may be between ten millimeters and one hundred millimeters. For example, the distance, D, may be at least approximately twenty millimeters in one or more implementations. This distance, D, may be small enough to allow the potting material 329 to flow to, or nearly to, the edge of the battery module 115 (e.g., to or near the edge of the CCA 400 and/or the cell carrier 310) while still providing sufficient surface area on a bottom surface 704 of the peripheral portion 500 for the potting material 329 to adhere to the bottom surface 704 while flowing under the potting dam 314, thereby blocking further flow of the potting material 329 over the edge of the battery module 115. The cross-section shown in FIG. 8 shows how the stiffener 506 may be formed from a ridge or a depression in the peripheral portion 500 of the potting dam 314. However, other stiffening features are contemplated. In the examples of FIGS. 7 and 8, a lip 700 extending (e.g., substantially horizontally) from the wall 502 can also be seen. The lip 700 may optionally be provided to discourage potting material 329 from flowing over the wall 502.

Figure 9:
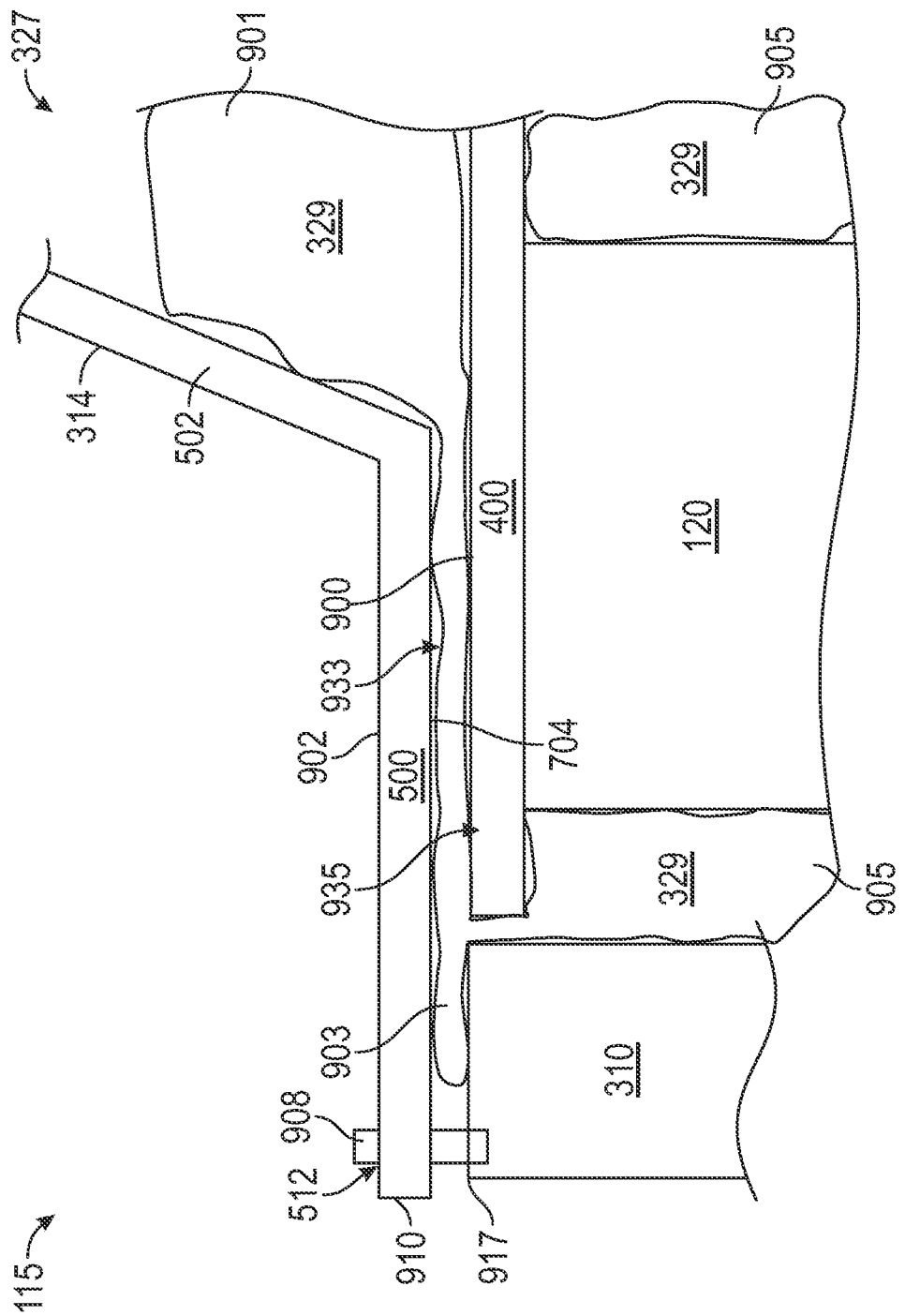
FIG. 9 illustrates a cross-sectional view of a portion of a battery module having a potting dam in accordance with one or more implementations.

FIG. 9 illustrates a cross-sectional view of a portion of the battery module 115 having the potting dam 314 installed thereon. As shown in FIG. 9, the peripheral portion 500 of the potting dam 314 may be configured to extend along a peripheral portion 935 of the CCA 400 (e.g., adjacent an edge of the CCA) in a direction that is parallel to the CCA 400 (e.g., to the outer surface 900 of the CCA 400). As shown, the peripheral portion 500 of the potting dam 314 may be spaced apart, by a gap 933, from the peripheral portion 935 of the CCA 400. As shown, this may allow a portion 903 of the potting material 329 to fill a portion of the gap 933. For example, a portion 901 of the potting material 329 may fill some or all of the opening 327 in the potting dam 314, and the portion 903 of the potting material 329 may flow under the peripheral portion 500, between the bottom surface 704 of the peripheral portion 500 and the outer surface 900 of the CCA 400. As shown, the potting material 329 may extend to, or nearly to, the edge 917 of the battery module 115 (e.g., to or near the edge of the CCA 400 or the cell carrier 310) without extending over the edge 917 of the battery module 115.

FIG. 9 also shows how an additional portion 905 of the potting material 329 may flow through and under the CCA 400 and into the interstitial spaces between the battery cells 120 within the cell carrier 310. FIG. 9 also shows how a fastener, such as fastener 908 may pass through an opening 512 in the peripheral portion 500 and into the cell carrier 310, to secure the potting dam 314 to the cell carrier 310, and thereby to the battery module 115. As shown, a portion 910 of the peripheral portion 500 of the potting dam 314 may extend beyond the opening 512 and the fastener 908.

In the example of FIG. 9, the thickness of the wall 502 is the same or similar to the thickness of the peripheral portion 500. In this configuration, when the battery module 115 is rested on a surface or other structure and/or another battery module or other structure is rested on the battery module 115 (e.g., after curing of the potting material 329), the wall 502 may fold or collapse. This folding or collapsing of the wall 502 may be acceptable at this stage of battery module assembly, as the wall 502 has served its purpose of damming the potting material 329. However, in one or more other implementations, the wall 502 may have a thickness (e.g., 1 mm-3 mm) that is greater than the thickness (e.g., 0.1-0.5 mm) of the peripheral portion 500, so that the wall 502 is able to support the weight of the battery module 115 or another structure on top of the battery module 115.

Figure 10:
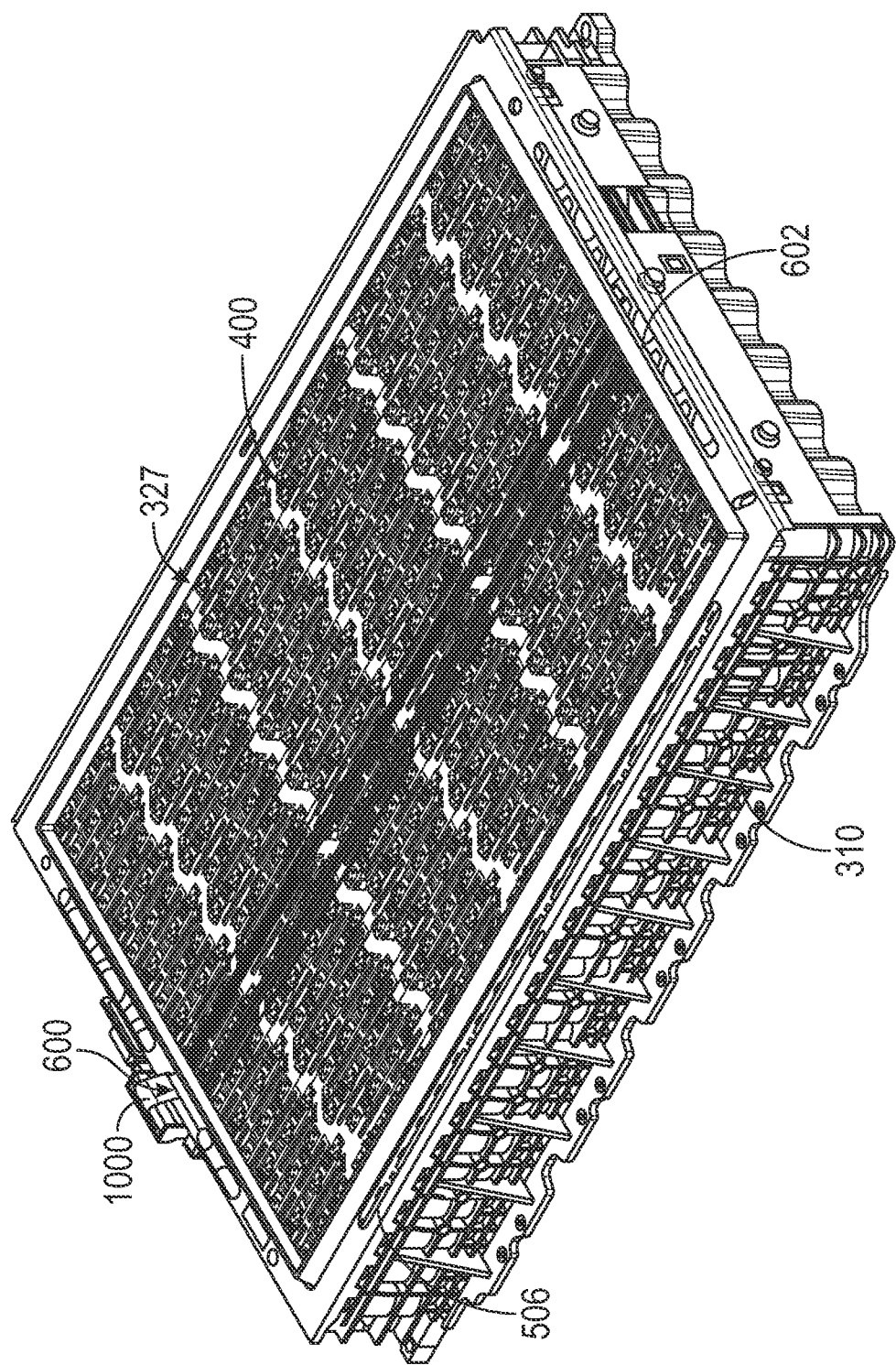
FIG. 10 illustrates a perspective view of a battery module having a potting dam, prior to application of a potting material, in accordance with one or more implementations.
Figure 11:
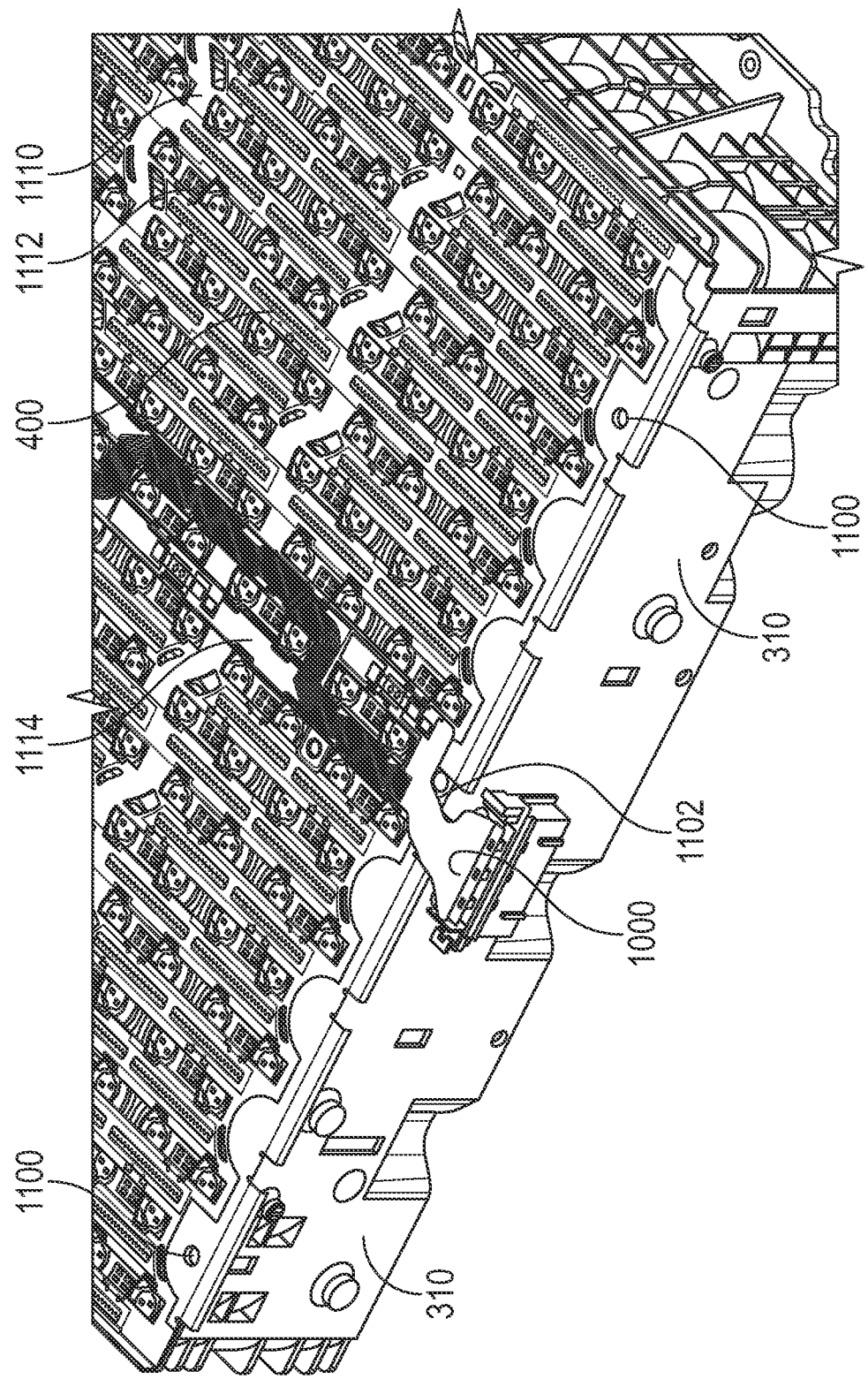
FIG. 11 illustrates a portion of the battery module of FIG. 10 with the potting dam removed in accordance with one or more implementations.

FIG. 10 illustrates a perspective view of a battery module 115 having a potting dam 314, prior to application of a potting material in accordance with one or more implementations. In the example of FIG. 10, the uncovered CCA 400 can be seen. FIG. 10 also shows a cable 1000 disposed within the notch 600 of the potting dam 314. FIG. 11 illustrates a portion of the battery module of FIG. 10 with the potting dam 314 is removed, and prior to application of the potting material 329 to the CCA 400.

As shown in FIG. 11, the CCA 400 may include a carrier structure 1110, tabs 1112 extending from the carrier structure to connect to battery cells 120 within the cell carrier 310, and collector structures 1114 that electrically couple to tabs 1112 to the cable 1000 (e.g., for connection to the busbars 320, 322, and/or 406). Also shown in FIG. 11 are openings 1100 in the CCA 400, the openings 1100 aligned with openings in the cell carrier 310, and configured to align with the openings 508 in the potting dam 314, so that a fastener (e.g., see fastener 908 of FIG. 8) may be received in the openings 1100, via the openings 508, to attach the potting dam 314 to the battery module 115. FIG. 11 also shows an opening 1102 that may be covered by the peripheral portion 500 of the potting dam 314, to prevent potting material 329 from flowing into the opening 1102.

Figure 12:
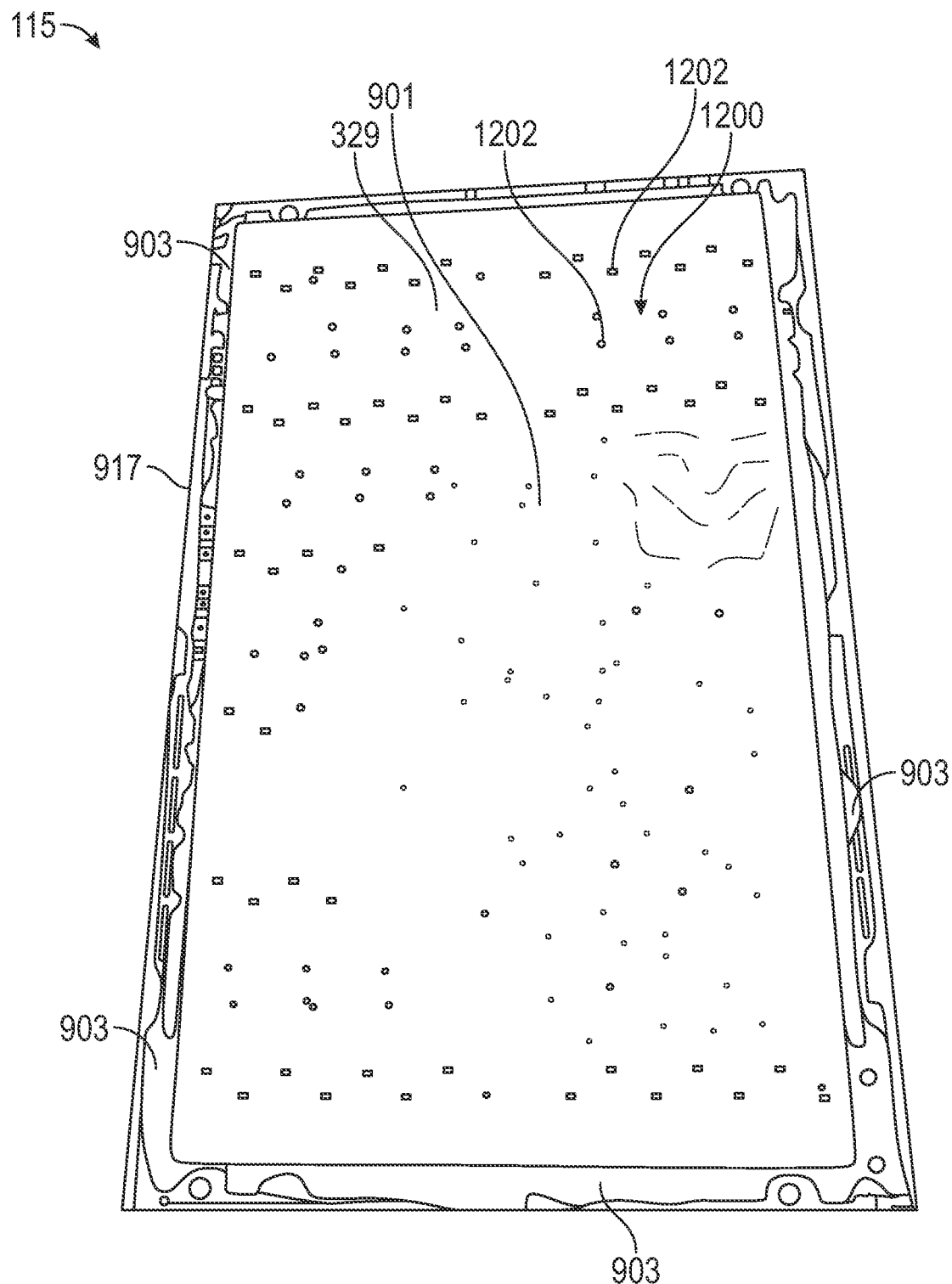
FIG. 12 illustrates perspective view of the battery module of FIG. 10 with the potting dam removed, after application of a potting material, in accordance with one or more implementations.

FIG. 12 illustrates perspective view of a top surface of the battery module of FIG. 10, after application and curing of a potting material 329, for illustrative purposes. As shown in FIG. 12, the portion 901 of the potting material 329 may (e.g., substantially) cover a central portion of the battery module 115 (e.g., a rectilinear portion that covers more than fifty percent, sixty percent, seventy percent, eighty percent, or ninety percent of the top surface of the battery module 115), and may form a top surface 1200 of the battery module 115. FIG. 12 also shows how the portion 903 of the potting material 329 may (e.g., substantially) surround the portion 901, and may cover one or more portions of the peripheral portion of the CCA 400 substantially up to the edge 917 of the battery module 115, without flowing over the edge 917. As shown, the portion 903 of the potting material 329 may extend to various distances, from the portion 903 toward the edge 917 of the battery module 115, at various different locations around the periphery of the battery module 115. FIG. 12 also shows how various openings 1202 in the CCA 400 may allow the potting material 329 to flow through the CCA 400 (e.g., and into the interstitial spaces between the battery cells 120 therebelow).

Figure 13:
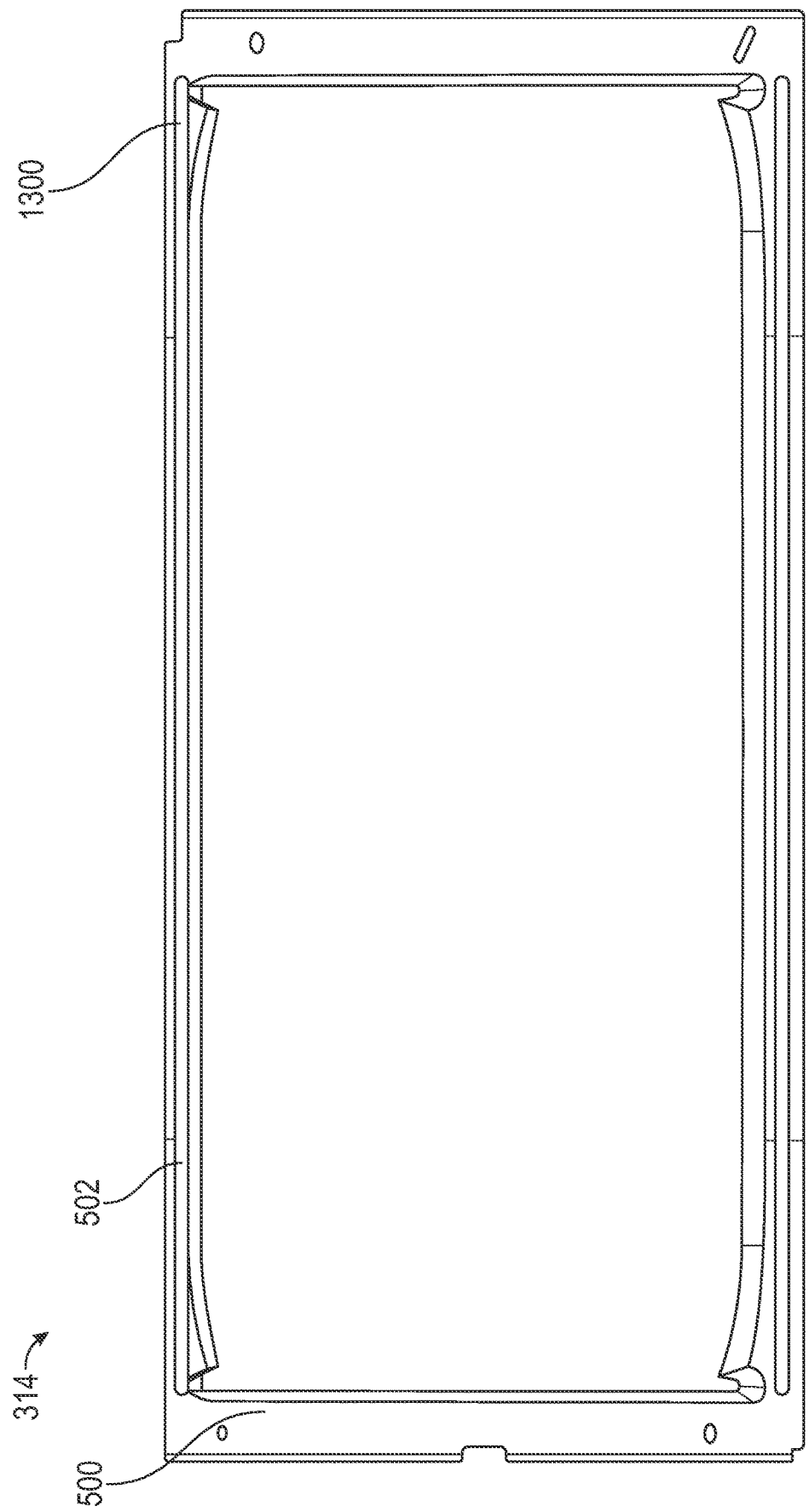
FIG. 13 illustrates a perspective view of an other implementation of a potting dam in accordance with one or more implementations.

As discussed herein, one or more implementations, when (after curing of the potting material 329 and while the potting dam 314 remains attached to the battery module) the battery module 115 is rested on a surface or other structure and/or another battery module or other structure is rested on the battery module 115, the wall 502 may fold or collapse. This folding or collapsing of the wall 502 may be acceptable at this stage of battery module assembly, as the wall 502 has served its purpose of damming the potting material 329. However, it may be preferable to be able to control the way the wall 502 folds or collapses (e.g., to control the final shape and/or size of the top and/or bottom surfaces of the battery module 115). FIG. 13 illustrates a perspective view of another implementation of a potting dam 314, in which the potting dam 314 includes a corner feature 1300 (e.g., in one or more or all of the interior corners of the central opening 327) configured to control the collapse of the wall 502 responsive to a pressure on a top edge of the wall 502. For example, as shown, the corner features 1300 may include one or more curves and/or jogs in the wall 502 that help to control the way the wall 502 folds when a pressure is applied thereto (e.g., so that the walls 502 fall flat on the surface of the battery module 115).

Figure 14A:
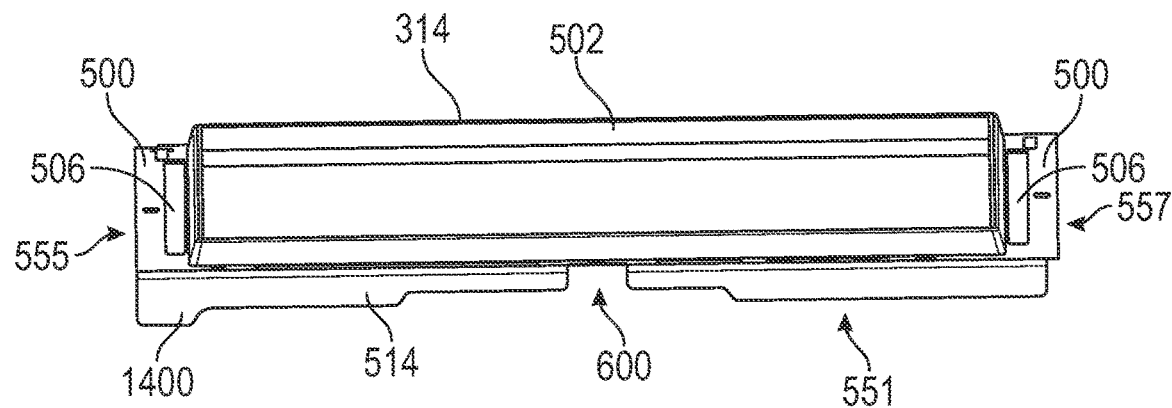
FIG. 14A illustrates another perspective view of a potting dam in accordance with one or more implementations.
Figure 14B:
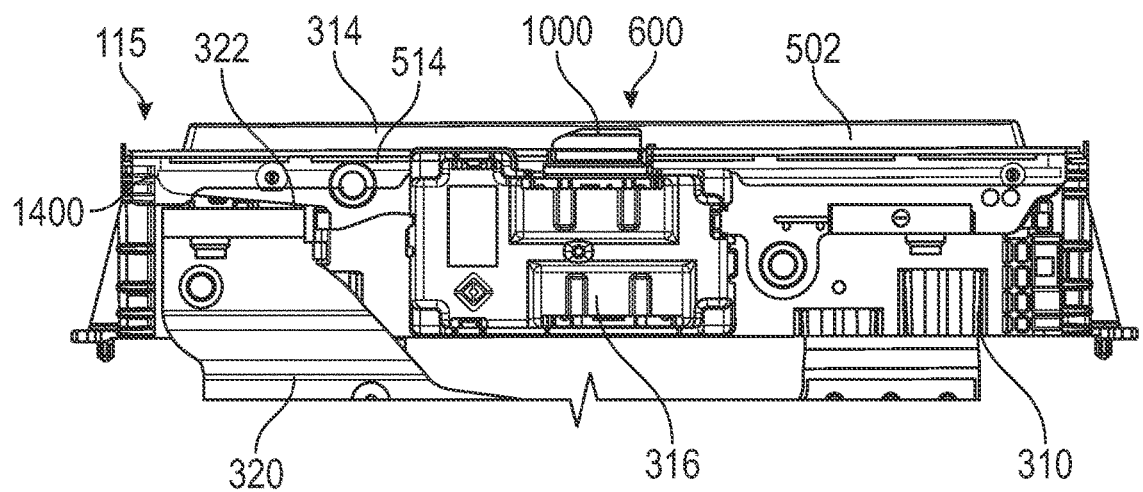
FIG. 14B illustrates a side view of a battery module having the potting dam of FIG. 14A in accordance with one or more implementations.

In one or more implementations, the potting dam 314 may be provided with one or more additional features for controlling the flow of the potting material 329. For example, FIG. 14A illustrates an end perspective view of the potting dam 314, in which it can be seen that the overhang 514 (e.g., along the edge 551) may be provided with additional structure, such as a stepped structure 1400. As shown, the stepped structure 1400 may extend further downward from the peripheral portion 500 at locations further from the center of the edge 551 (e.g., at increasing distances from the notch 600). In this way, the overhang 514 may provide additional protection (e.g., from potting material overflow) for electrical components of the battery module 115. For example, FIG. 14B illustrates a side view of the top submodule 304 with the potting dam 314 installed thereon. As shown, the stepped structure 1400 of the overhang 514 may extend over a portion of the busbar 322. The stepped structure 1400 of the overhang 514 may also help protect (e.g., from potting material 329) the busbar 320, the BVT module 316, and/or other electrical and/or mechanical components on the end of the battery module 115 (e.g., electrical components mounted to the exterior of the cell carrier 310).

As illustrated by the examples of FIGS. 3-14B, in one or more implementations, a battery subassembly (e.g., battery module 115) may be provided that includes a potting dam 314 for a battery subassembly. The potting dam 314 may include a peripheral portion 500 configured to cover a peripheral portion 935 of an electrical structure (e.g., CCA 400) of the battery subassembly, a wall 502 that extends (e.g., at an obtuse angle) from the peripheral portion 500, and a central opening 327 defined by the wall 502. The wall 502 may be configured to dam a potting material 329 provided onto the electrical structure via the central opening 327. The battery subassembly may also include the electrical structure. The electrical structure may include a current collector assembly 400.

The battery subassembly may also include the potting material 329. The potting material 329 may include a first portion 901 disposed within the central opening 327 of the potting dam, and a second portion 903 in contact with a surface (e.g., bottom surface 704) of the peripheral portion 500. The second portion 903 in contact with the surface of the peripheral portion 500 may be disposed in a gap 933 between the electrical structure and the peripheral portion 500 of the potting dam 314. The potting material 329 may include a third portion 905 disposed in contact with one or more battery cells 120 of the battery subassembly. The second portion 903 of the potting material 329 may extend around an entire periphery of the first portion 901. The potting material may include a syntactic potting material in one or more implementations.

Figure 15:
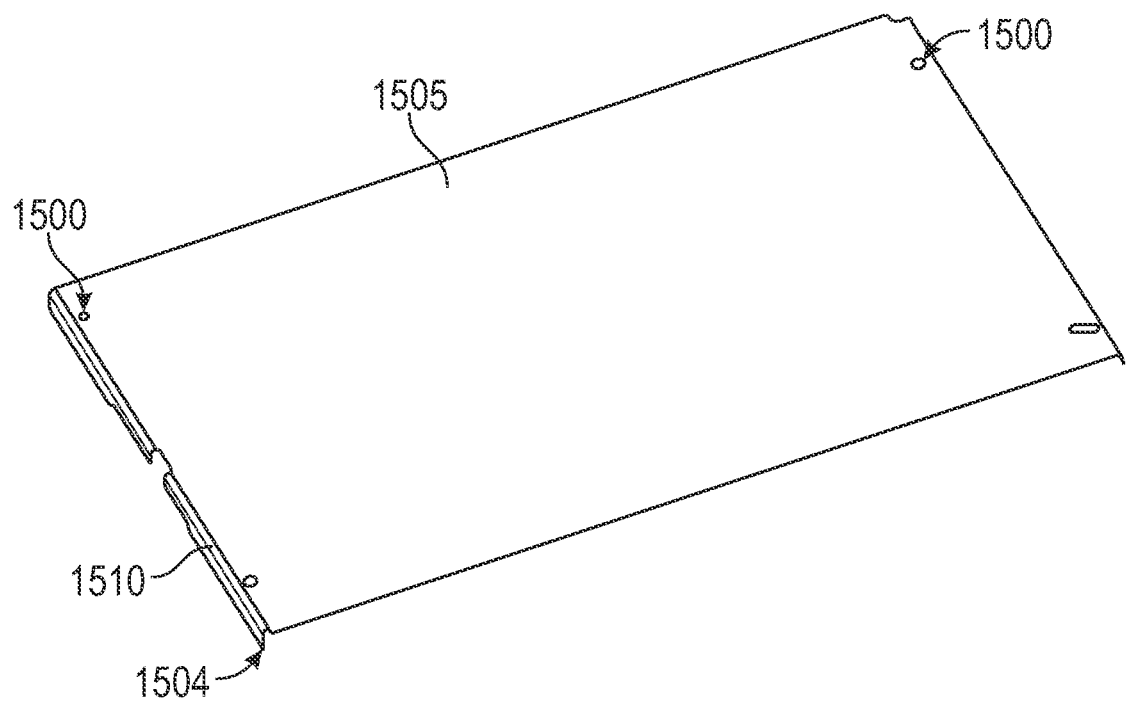
FIG. 15 illustrates a perspective view of a cover for a battery module in accordance with one or more implementations.

In the examples of FIGS. 3-14B, a potting dam having a central opening is shown and described. In one or more implementations, the potting dam may be replaced on the battery module 115 with a cover that includes features for providing a potting dam. For example, FIG. 15 illustrates a perspective view of a cover 1514 for a battery module in accordance with one or more implementations. As shown in FIG. 15, the cover 1514 may include substantially planar main structure 1505 that is configured to cover the electrical components of the battery module 115. As shown, the cover 1514 may include one or more attachment features 1500 configured to allow an edge portion 1510 of the cover 1514 to be fixed to another structure of the battery module 115 (e.g., to the cell carrier 310). As shown in FIG. 15, the edge portion 1510 of the cover 1514 may include an overhang 1504. For example, the overhang 1504 may be configured to curve over an outer edge of a cell carrier 310 in one or more implementations.

Figure 16:
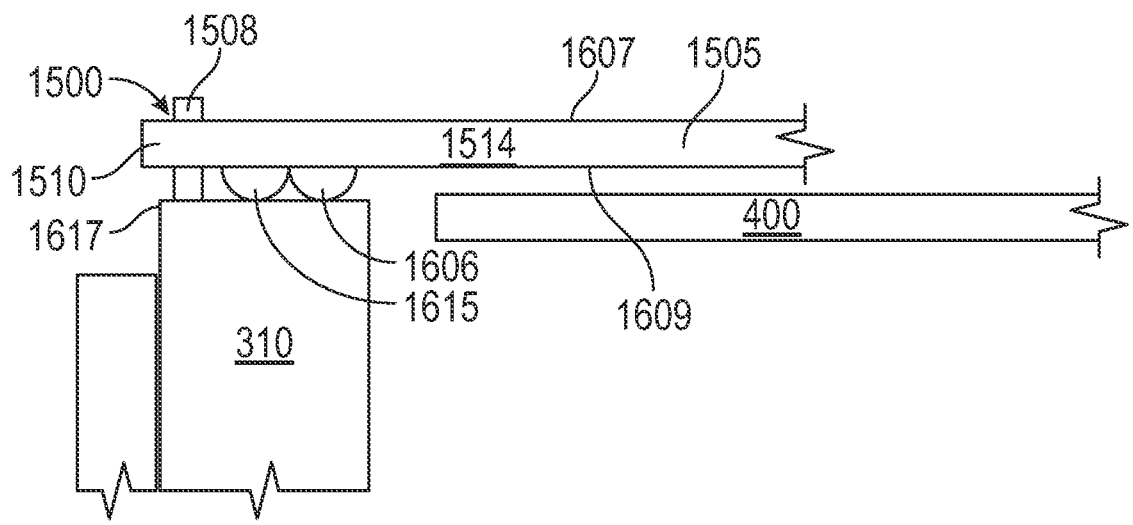
FIG. 16 illustrates a cross-sectional view of a portion of a battery module including a cover in accordance with one or more implementations.

In one or more implementations, the attachment features 1500 may include an opening. For example, FIG. 16 illustrates a cross-sectional view of a portion of a battery module including a cover 1514 in accordance with one or more implementations. As shown in the cross-sectional side view of FIG. 16, the opening may be configured to receive a fastener 1508 therethrough. As examples, the fastener 1508 may be a pin, a screw, or other fastening member. As shown in FIG. 16, the fastener 1508 may pass through the opening (e.g., attachment features 1500) and into a portion of the cell carrier 310.

As shown, the cover 1514 (e.g., for a battery module 115) may include a substantially planar main structure 1505 configured to cover an electrical structure (e.g., CCA 400) of the battery module. The substantially planar main structure 1505 may include an outer surface 1607 and an opposing inner surface 1609 that is configured to face the electrical structure of the battery module. The cover 1514 may also include a sealing feature 1606 that protrudes from the inner surface 1609 of the substantially planar main structure 1505. For example, the sealing feature 1606 may run around at least a portion of a periphery of the substantially planar main structure 1505 (e.g., around the entire periphery of the substantially planar main structure, along one, two, three, or four edges of the substantially planar main structure, or around another portion of the substantially planar main structure).

As shown, the sealing feature 1606 may be configured to sealingly interface with a peripheral surface 1615 of the battery subassembly (e.g., a peripheral surface of a cell carrier 310) to impede or prevent a liquid, such as a potting material 329, from passing between the cell carrier 310 and the cover 1514. For example, the cover 1514 may be placed over the CCA 400 and attached to the cell carrier 310 before a potting material 329 is injected into the cell carrier 310 in the spaces between the battery cells 120 therein. In the arrangement of FIG. 16, the cover 1514 (e.g., including the sealing feature 1606) may act as a potting dam to prevent leakage of the potting material during injection. Resultingly, in some implementations, the battery module 115 may include potting material 329 in contact with the sealing features 1606 of cover 1514.

In one or more implementations, the edge portion 1510 of the substantially planar main structure 1505 extends beyond the sealing feature 1606 and includes an attachment feature 1500 (e.g., an opening configured to allow the edge portion 1510 to be fixed to the cell carrier 310. As discussed herein, the attachment feature 1500 may include an opening that is configured to receive a fastener 1508 therethrough. As discussed herein, the edge portion 1510 of the cover 1514 may also include an overhang 1504 configured to curve over an outer edge 1617 of the cell carrier 310. In various implementations, the sealing feature 1606 may be attached to the inner surface 1609 of the cover 1514 or may be an integral feature of the cover 1514 (e.g., a protruding portion of a unitary structure forming the cover). In one or more implementations, the cover 1514 may be a sustainable cover and may be formed from a material at least twenty-five percent, fifty percent, seventy percent, or seventy-five percent of which is a recycled polymer material. For example, the cover 1514 may be formed from a thermoplastic (e.g., polyethylene terephthalate (PET)) and/or a recycled thermoplastic (e.g., rPET).

Figure 17:
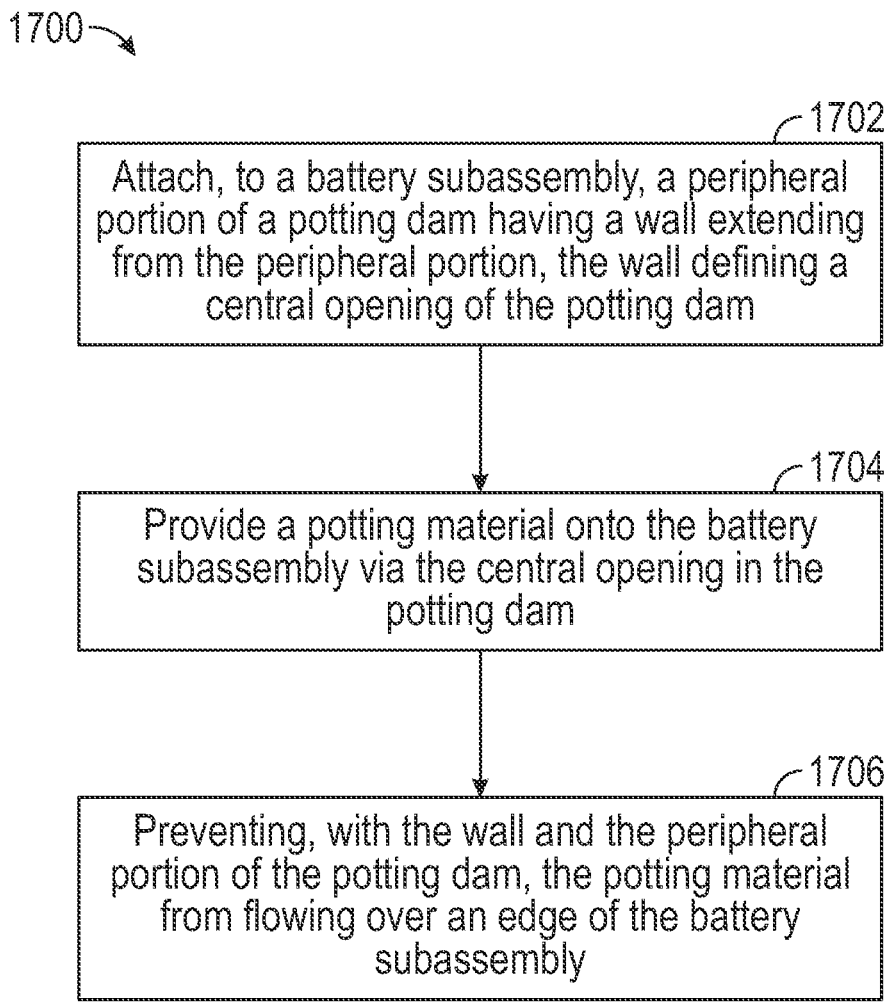
FIG. 17 illustrates a flow chart of illustrative operations that may be performed for assembling a battery module in accordance with one or more implementations.

FIG. 17 illustrates a flow diagram of an example process 1700 that may be used for assembling a battery module, in accordance with implementations of the subject technology. For explanatory purposes, the process 1700 is primarily described herein with reference to the potting dam 314 of FIGS. 3-114B. However, the process 1700 is not limited to the potting dam 314 of FIGS. 3-14B, and one or more blocks (or operations) of the process 1700 may be performed by one or more other structural components of other suitable moveable apparatuses, devices, or systems. Further for explanatory purposes, some of the blocks of the process 1700 are described herein as occurring in serial, or linearly. However, multiple blocks of the process 1700 may occur in parallel. In addition, the blocks of the process 1700 need not be performed in the order shown and/or one or more blocks of the process 1700 need not be performed and/or can be replaced by other operations.

As illustrated in FIG. 17, at block 1702, the process 1700 may include attaching, to a battery subassembly (e.g., battery module 115), a peripheral portion 500 of a potting dam 314 having a wall 502 extending from the peripheral portion 500, the wall 502 defining a central opening 327 of the potting dam 314. Attaching the peripheral portion 500 to the battery subassembly may include attaching the peripheral portion 500 to the battery subassembly by passing one or more fasteners through one or more openings (e.g., openings 508, 510, and/or 512) in the peripheral portion 500, and into one or more aligned openings in a cell carrier and/or a CCA of the battery subassembly).

At block 1704, a potting material 329 may be provided onto the battery subassembly via the central opening 327 in the potting dam 314. For example, the potting material 329 may be poured or otherwise disbursed through the central opening 327 in the potting dam 314, onto a surface 902 of the electrical structure (e.g., the CCA 400) of the battery module 115.

At block 1706, the wall 502 and the peripheral portion 500 of the potting dam 314 may restrict (e.g., prevent) the potting material 329 from flowing over an edge 917 of the battery subassembly. For example, restricting, with the wall 502 and the peripheral portion 500 of the potting dam 314, the potting material 329 from flowing over the edge 917 of the battery subassembly may include allowing a portion 903 of the potting material 329 to flow under the peripheral portion 500 of the potting dam 314 between a surface 704 of the peripheral portion 500 of the potting dam 314 and a surface 900 of an electrical structure (e.g., CCA 400) of the battery subassembly. A portion of the potting material 329 may adhere to a bottom surface of the peripheral portion and block the flow of the potting material 329.

In one or more implementations, the process 1700 may be performed for a first battery subassembly (e.g., top submodule 304) of a battery module 115 having multiple battery subassemblies. In one or more implementations, the potting material 329 may be allowed to cure, or to partially cure, before the battery subassembly is flipped over (e.g., 180 degrees) and the process 1700 is repeated with an additional potting dam 314 and another battery subassembly (e.g., bottom submodule 306) on an opposing side of the battery module 115.

Aspects of the subject technology can help improve the efficiency and/or range of electric vehicles. This can help facilitate the functioning of and/or proliferation of electric vehicles, which can positively impact the climate by reducing greenhouse gas emissions.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f), unless the element is expressly recited using the phrase "means for" or, in the case of a method claim, the element is recited using the phrase "step for".

Those of skill in the art would appreciate that the various illustrative blocks, modules, elements, components, methods, and algorithms described herein may be implemented as hardware, electronic hardware, computer software, or combinations thereof. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. An apparatus, comprising:
    a potting dam, comprising:
        a peripheral portion configured to cover and extend substantially parallel to a peripheral portion of an electrical structure of a battery subassembly;
        a wall that extends from the peripheral portion; and
        a central opening defined by the wall, wherein the wall is configured to block a potting material provided via the central opening, and the peripheral portion surrounds the wall and the central opening, wherein the peripheral portion of the potting dam that covers and extends substantially parallel to the peripheral portion of the electrical structure is configured to be spaced apart by a gap from the peripheral portion of the electrical structure, and to allow a portion of the potting material to fill a portion of the gap.

2. The apparatus of claim 1, wherein the wall extends around and defines an entire periphery of the central opening and extends at an obtuse angle from the peripheral portion.

3. The apparatus of claim 2, wherein the peripheral portion of the potting dam is configured to extend along the portion of the electrical structure in a direction that is parallel to the structure.

4. The apparatus of claim 3, wherein the peripheral portion of the potting dam is configured to allow the portion of the potting material to fill the portion of the gap and to adhere to a surface of the of the peripheral portion while flowing in the gap to block the potting material from flowing over an edge of the electrical structure.

5. The apparatus of claim 1, wherein the electrical structure comprises a current collector assembly.

6. The apparatus of claim 1, wherein the potting dam further comprises a first overhang that extends from the peripheral portion of the potting dam along a first edge of the potting dam, and a second overhang that extends from the peripheral portion of the potting dam along a second edge of the potting dam.

7. The apparatus of claim 1, wherein the potting dam comprises a first edge, a second edge perpendicular to the first edge, a third edge parallel to and separated by the central opening from the first edge, and a fourth edge parallel to and separated by the central opening from the second edge, and wherein the potting dam further comprises a first stiffener that extends along a portion of the peripheral portion of the potting dam on the first edge, and a second stiffener that extends along a portion of the peripheral portion of the potting dam on the third edge.

8. The apparatus of claim 7, wherein the first edge and the third edge have a first length, wherein the second edge and the fourth edge have a second length, and wherein the first length is greater than the second length.

9. The apparatus of claim 8, wherein the potting dam further comprises a first opening on the first edge and a second opening on the second edge, the first opening and the second opening each configured to receive a fastener for securing the potting dam to the battery subassembly.

10. The apparatus of claim 1, wherein the peripheral portion of the potting dam extends a distance of at least twenty millimeters from the wall.

11. The apparatus of claim 1, wherein the potting dam further comprises a corner feature configured to control a collapse of the wall responsive to a pressure on a top edge of the wall.

12. A battery subassembly comprising:
    a potting dam, the potting dam comprising:
        a peripheral portion configured to cover and extend substantially parallel to a peripheral portion of an electrical structure of the battery subassembly;
        a wall that extends from the peripheral portion;
        an opening defined by the wall, wherein the wall separates the opening from the peripheral portion and is configured to dam a potting material provided onto the electrical structure via the opening, wherein the peripheral portion of the potting dam that covers and extends substantially parallel to the peripheral portion of the electrical structure is configured to be spaced apart by a gap from the peripheral portion of the electrical structure, and to allow a portion of the potting material to fill a portion of the gap;
        an overhang extending from an edge of the peripheral portion; and a lip extending substantially horizontally from the wall, wherein the overhang and the lip are further configured to dam the potting material.

13. The battery subassembly of claim 12, further comprising the electrical structure, wherein the electrical structure comprises a current collector assembly configured to electrically couple with battery cells of the battery subassembly.

14. The battery subassembly of claim 13, further comprising the potting material, wherein the potting material comprises a first portion disposed within the opening of the potting dam, and a second portion in contact with a surface of the peripheral portion.

15. The battery subassembly of claim 14, wherein the second portion in contact with the surface of the peripheral portion is disposed in the gap between the electrical structure and the peripheral portion of the potting dam.

16. The battery subassembly of claim 14, wherein the potting material comprises a third portion disposed in contact with one or more battery cells of the battery subassembly.

17. The battery subassembly of claim 14, wherein the second portion of the potting material extends around an entire periphery of the first portion.

18. The battery subassembly of claim 12, wherein the potting material comprises a syntactic potting material and wherein the wall extends at an obtuse angle from the peripheral portion.

19. A method, comprising:
   attaching, to a battery subassembly having an electrical structure with a surface, a peripheral portion of a potting dam having a wall extending from the peripheral portion such that the peripheral portion of the potting dam covers and extends over and is parallel to a peripheral portion of the surface of the electrical structure, the wall defining a central opening of the potting dam;
   providing a potting material onto the surface of the electrical structure of the battery subassembly via the central opening in the potting dam; and
   restricting, with the wall and the peripheral portion of the potting dam, the potting material from flowing over an edge of the electrical structure of the battery subassembly, wherein the peripheral portion surrounds the wall and the central opening,
   wherein restricting, with the wall and the peripheral portion of the potting dam, the potting material from flowing over the edge of the battery subassembly comprises allowing a portion of the potting material to flow under the peripheral portion of the potting dam between a surface of the peripheral portion of the potting dam and a surface of an electrical structure of the battery subassembly.

20. The method of claim 19, wherein allowing the portion of the potting material to flow under the peripheral portion of the potting dam between the surface of the peripheral portion of the potting dam and the surface of the electrical structure of the battery subassembly comprises allowing the potting material to adhere to the surface of the of the peripheral portion while under the peripheral portion of the potting dam to block the potting material from flowing over the edge of the electrical structure.

* * * * *

UNITED STATES PATENT AND TRADEMARK OFFICE
CERTIFICATE OF CORRECTION

| | |
|---|---|
| PATENT NO. | : 12,155,092 B1 |
| APPLICATION NO. | : 18/540697 |
| DATED | : November 26, 2024 |
| INVENTOR(S) | : Akshay Kishor Murkute et al. |

Page 1 of 1

It is certified that error appears in the above-identified patent and that said Letters Patent is hereby corrected as shown below:

In the Claims

Column 24, Line 13 (Claim 4): "surface of the of the" should read --surface of the--;

Column 26, Line 28 (Claim 20): "surface of the of the" should read --surface of the--.

Signed and Sealed this
Twenty-fifth Day of February, 2025

Coke Morgan Stewart
*Acting Director of the United States Patent and Trademark Office*